(12) United States Patent
Matsuoka et al.

(10) Patent No.: US 6,587,593 B1
(45) Date of Patent: Jul. 1, 2003

(54) IMAGE PROCESSING DEVICE AND IMAGE PROCESSING METHOD

(75) Inventors: Atsuro Matsuoka, Yamatokoriyama (JP); Ryuji Funayama, Nara (JP); Harunobu Mori, Yamatokoriyama (JP); Hajime Takezawa, Yamatokoriyama (JP); Minehiro Konya, Daito (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/300,834

(22) Filed: Apr. 28, 1999

(30) Foreign Application Priority Data

Apr. 28, 1998 (JP) ............................................. 10-119554

(51) Int. Cl.[7] ................................................. G06K 9/40
(52) U.S. Cl. ......................................... 382/260; 382/267
(58) Field of Search ................................. 382/260–269, 382/258–259

(56) References Cited

U.S. PATENT DOCUMENTS

| | | | | |
|---|---|---|---|---|
| 4,393,402 A | * | 7/1983 | Keyes et al. | 378/98.11 |
| 5,018,215 A | * | 5/1991 | Nasr et al. | 348/169 |
| 5,790,269 A | * | 8/1998 | Masaki et al. | 345/421 |
| 5,862,264 A | * | 1/1999 | Ishikawa et al. | 382/249 |
| 5,974,158 A | * | 10/1999 | Auty et al. | 358/1.9 |
| 6,046,821 A | * | 4/2000 | Curry | 358/1.9 |

FOREIGN PATENT DOCUMENTS

| | | | | |
|---|---|---|---|---|
| FR | 2653961 A1 | * | 5/1991 | H04N/5/14 |
| JP | 6301773 | | 10/1994 | |
| JP | 2685458 | | 8/1997 | |

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP

(57) ABSTRACT

An image processing device of the present invention is provided with an area position specifying device and a computing device. When the user specifies a desired object by using the area position specifying device, the computing device generates an emphasized image, in which the specified object is emphasized, and a line image, and the computing device further produces a composite image of these images so as to achieve an illustration image. In addition to the line image, the emphasized image is produced so that it is possible to emphasize an object desired by the user regardless of a state of the line image; consequently, it is possible to generate a natural illustration image in accordance with the actual image.

19 Claims, 26 Drawing Sheets

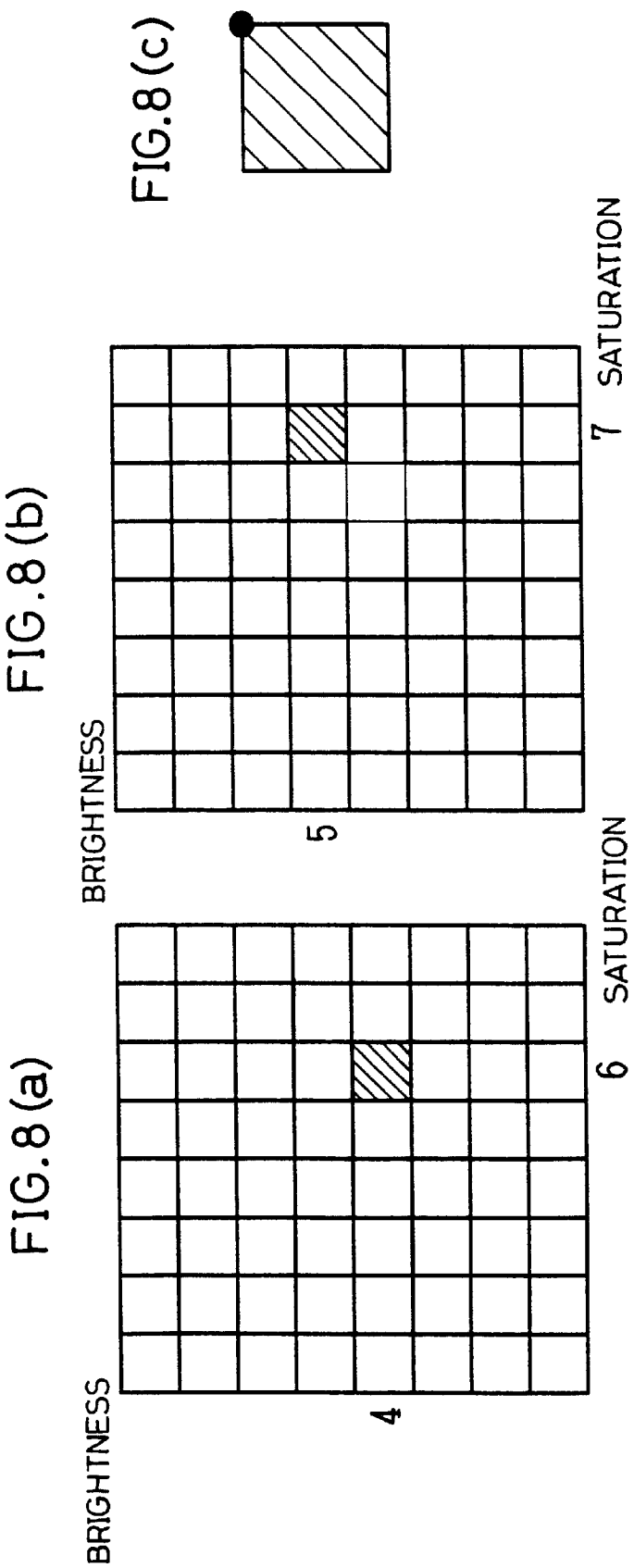

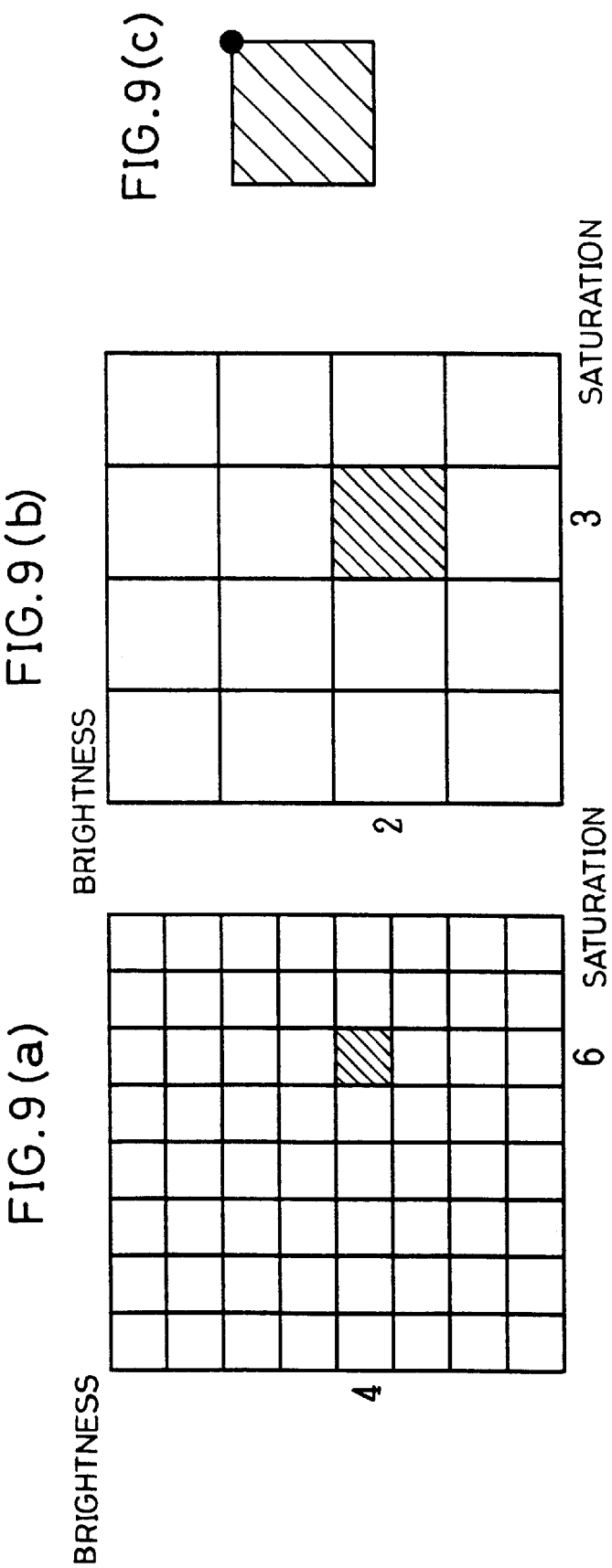

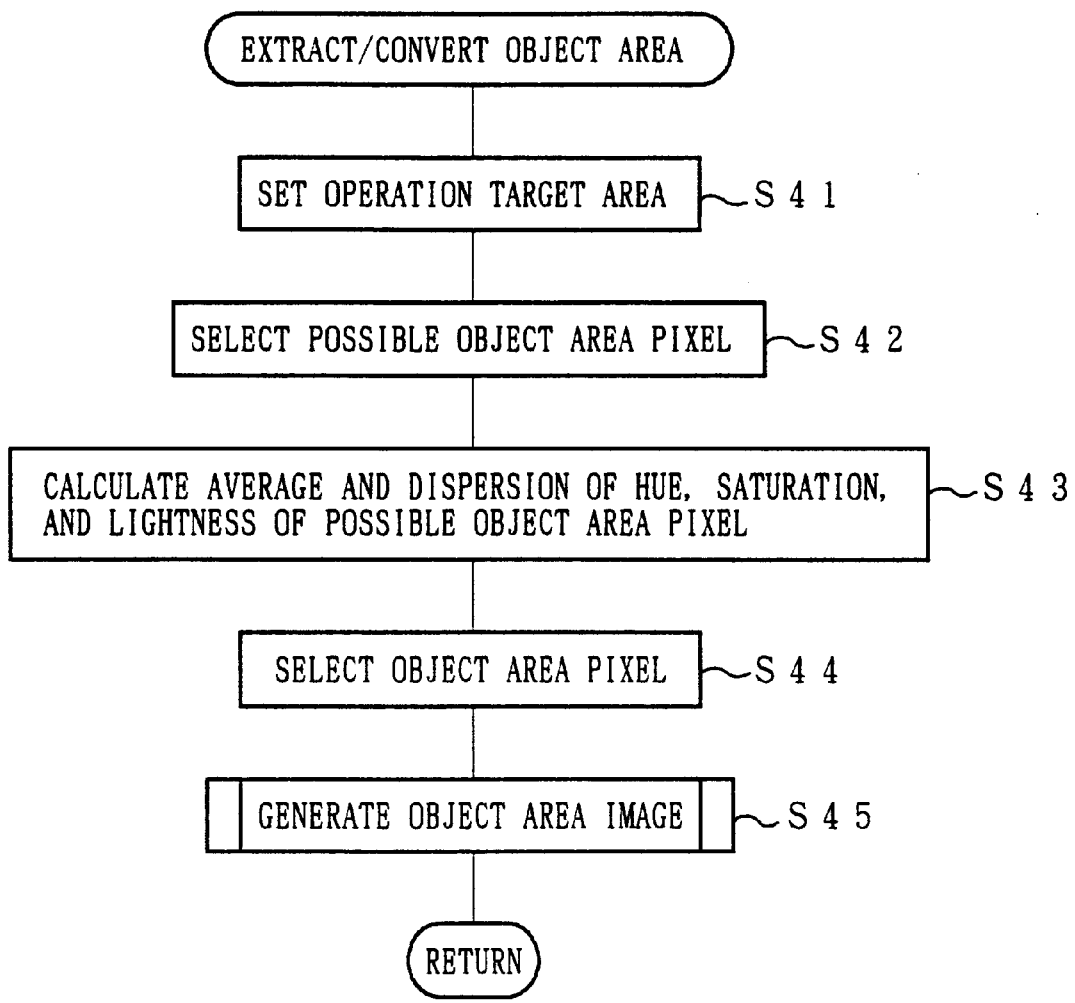

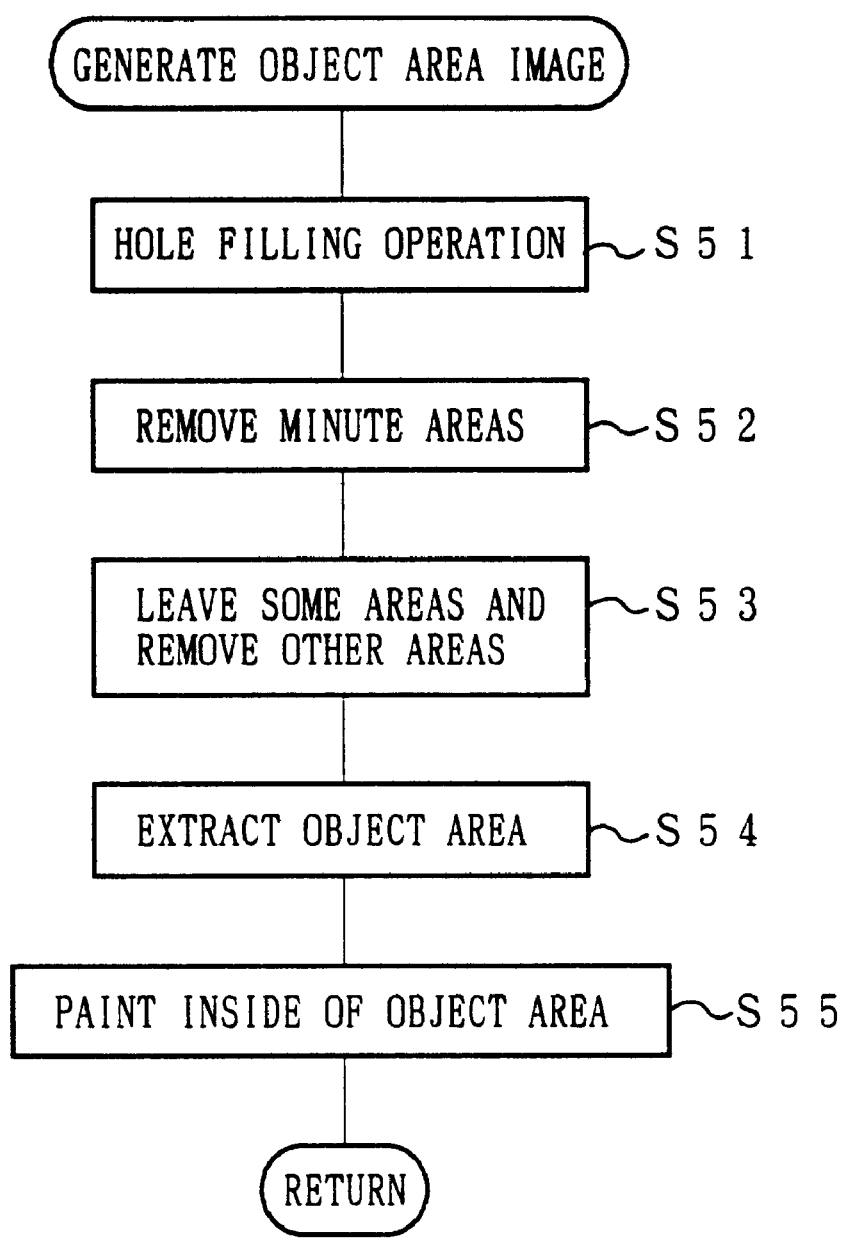

 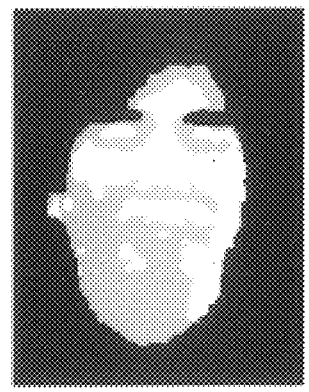
FIG.22(a)  FIG.22(b)  FIG.22(c)

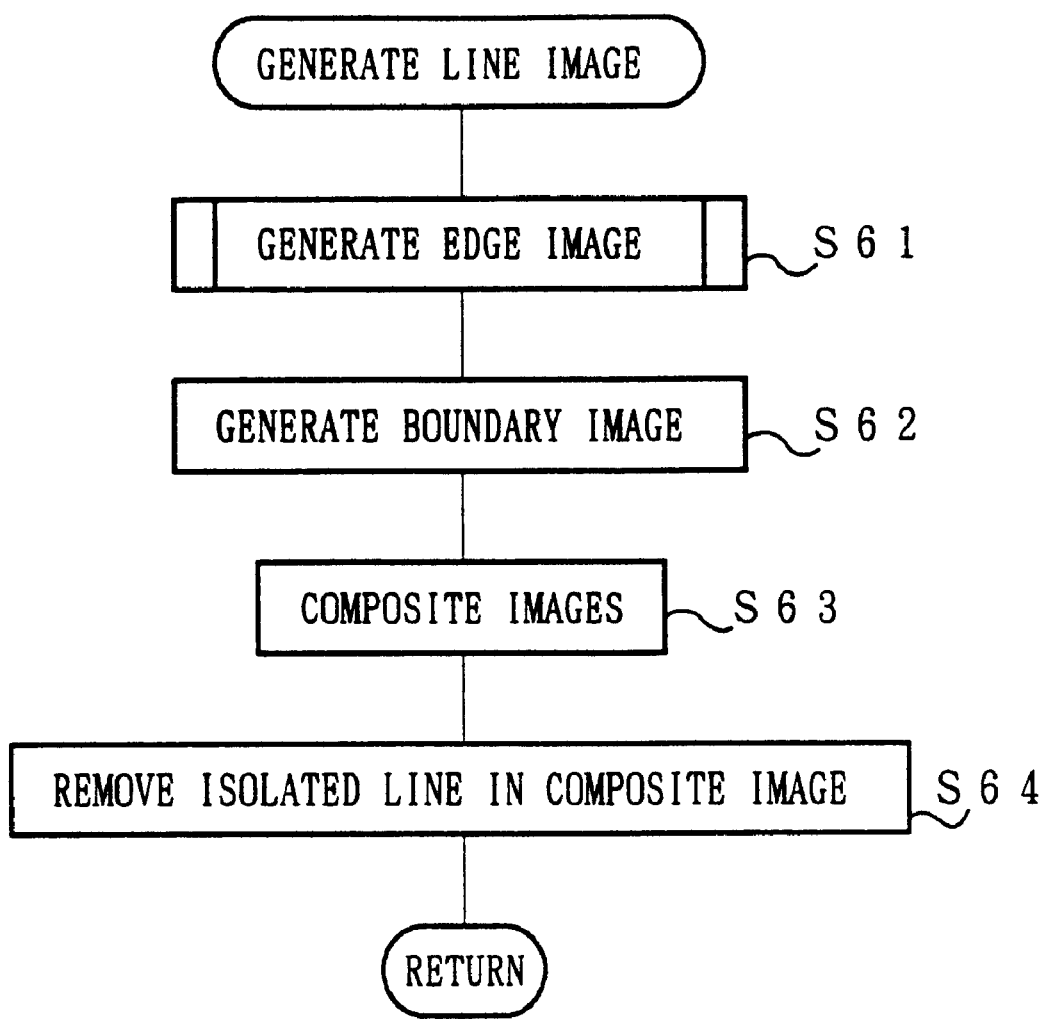

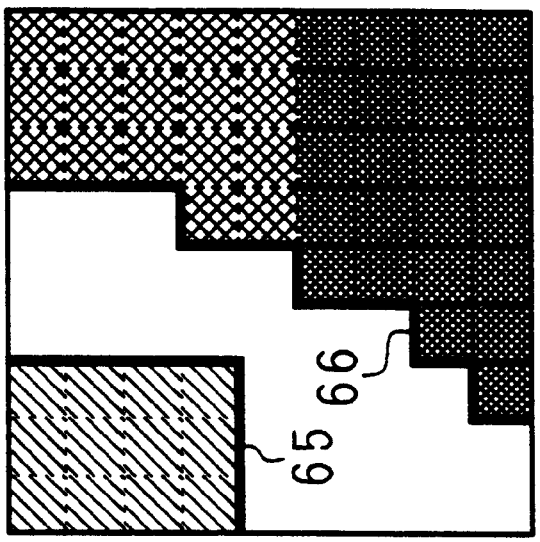
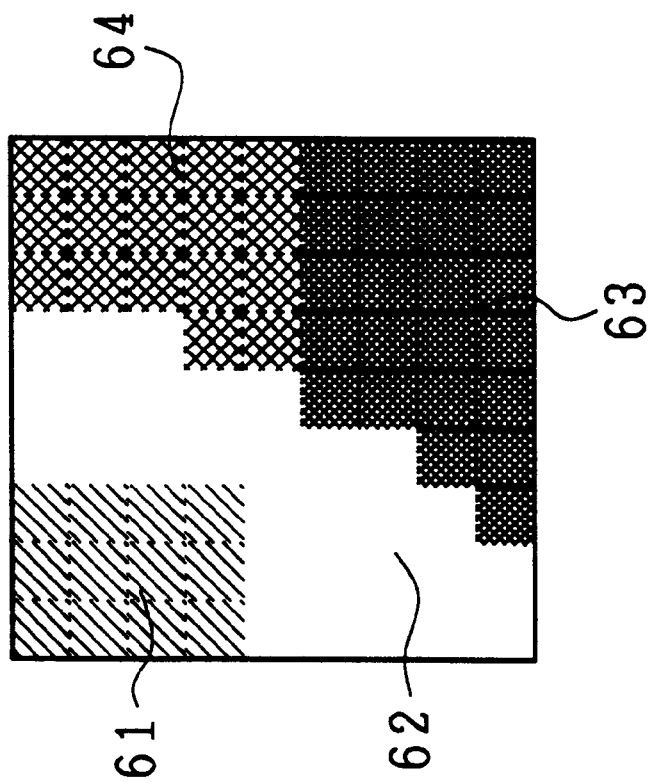

IMAGE PROCESSING DEVICE AND IMAGE PROCESSING METHOD

FIELD OF THE INVENTION

This invention relates to an image processing device which is capable of converting a captured image to an image desired by the user, for example, converting a photo to an image like an illustration for use in devices such as a personal computer, a word processor, a work station, an office computer, a portable information tool, a copying machine, a scanning device, a facsimile, a television, a video cassette recorder, and a video camera, and further relates to an image processing method.

BACKGROUND OF THE INVENTION

Conventionally, in the case when an image like an illustration is generated from a photo or an image, the most common method is that a skillful worker draws the image by hand. This process demands an extremely special technique and a high skill; therefore, this work cannot be done by every worker. Further, since this work is conducted by hand, this work is a time-consuming process and is not suitable for mass production.

Therefore, recently, in order to realize a shorter working hours and mass production, the use of an image processing device mounted on devices such as a personal computer and a word processor has been studied so as to generate an image like an illustration. For example, a line image is extracted (line extracting operation) and colors are subtracted (subtractive process).

As the method for extracting a line image, for example, a method which adopts a Sobel filter has been used. This method makes it possible to extract an edge portion in an image by using a simple algorithm; however, this method has drawbacks such as a line varying thickness for each portion. Further, the subtractive process, which has been commonly used, is performed in accordance with a histogram of a pixel value(RGB value or brightness value); thus, another drawback appears as follows: a part to be integrated into one color, for example, a part smoothly varying brightness(gradation) is divided into a plurality of colors in an image.

Moreover, as a method for converting an image such as a photo into an image like an illustration, for example, inventions such as an "image processing method" (Japanese Published Examined Patent Application No.2685458 (Applicant; Canon Inc. Tokukaihei 1-109479, published on Apr. 26, 1989)) have been devised. In the above-mentioned image processing method, an edge is extracted and an area surrounded by the edge is filled with a certain color so as to generate an image like an illustration.

However, in the "image processing method" of the patent application number 2685458, an edge is extracted and an area surrounded by the edge is filled with a certain color; thus, the edge needs to constitute a closed area without any disconnection so that upon extracting an edge for a full-color image, in some images, a large number of small areas appear, or a closed area is not extracted at all. Thus, in some images, it is difficult to generate a desired illustration image.

Further, in the above-mentioned image processing method, an edge portion is not converted so that an original image partially remains on a generated illustration image, resulting in an unnatural image in some cases.

SUMMARY OF THE INVENTION

The object of the present invention is to provide an image processing device and an image processing method which are capable of generating a natural illustration image from any kind of original image in response to the need.

In order to achieve the above-mentioned objective, the image processing device of the present invention, which performs an image processing operation on the inputted original image, is provided with an image compositing section which allows the original image to undergo a subtractive process so as to generate a subtractive image, generates a line image from the original image, and produces a composite image of the subtractive image and the line image.

In the above-mentioned arrangement, the original image is, for example, an image such as a digitized color photo. Further, the subtractive process is, for example, a process in which the original image is divided into a plurality of areas, and each of the areas is painted by using one color so as to visually enlarge a size of a pixel constituting the image, thereby simplifying the image. Furthermore, the line image is, for example, a binary image which is constituted by a black line and a white area so as to generate an edge surrounding an object of the original image.

Moreover, in the above-mentioned arrangement, the image compositing section allows the original image to undergo the subtractive process so as to generate a subtractive image, generates the line image from the original image, and produces a composite image of the subtractive image and the line image.

With this arrangement, unlike an image processing device which generates a line image constituted by an edge image and colors an area surrounded by the edge(closed area); a line image does not need to be a closed area. Hence, it is possible to prevent extraction of a number of small closed areas. Further, it is also possible to prevent a state in which no closed area can be extracted. Therefore, a natural composite image can be produced in accordance with the actual image.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) is an explanatory drawing showing the tone of the representative color. FIG. 8(b) is an explanatory drawing showing a tone, which is one-step higher than the tone shown in FIG. 8(a) in saturation and brightness. FIG. 8(c) is an explanatory drawing showing the enlarged tone of FIG. 8(b).

FIG. 9(a) is an explanatory drawing showing the tone of the representative color. FIG. 9(b) is an explanatory drawing showing a tone of the representative color in a higher tone space. FIG. 9(c) is an explanatory drawing showing the enlarged tone of FIG. 9(b).

FIG. 10 is a flowchart showing the detail of an object area extracting/converting operation performed in the image processing operation shown in FIG. 3.

FIG. 16 is a flowchart showing an object area image generating operation performed in the object area extracting/converting operation shown in FIG. 10.

FIG. 22(a) is an explanatory drawing showing the original image including the face. FIG. 22(b) is an explanatory drawing showing a face area extracted from the original image. FIG. 22(c) is an explanatory drawing showing the face area which is divided into two.

FIG. 23 is a flowchart showing a line image generating operation performed in the image processing operation of FIG. 3.

FIG. 25(a) is an explanatory drawing showing a divided area image. FIG. 25(b) is an explanatory drawing showing the divided area image in which lines are painted.

DESCRIPTION OF THE EMBODIMENTS

The following explanation describes one embodiment of the present invention.

An image processing device of the present embodiment (hereinafter, referred to as the present image processing device) is a device for generating an illustration image (image having a tough of an illustration) from a photo or an image.

Further, especially, the present image processing device is arranged so as to convert the entire original image into an illustration image and to emphatically convert a certain area of the original image into a portrait image, thereby generating an illustration image.

Figure 1:
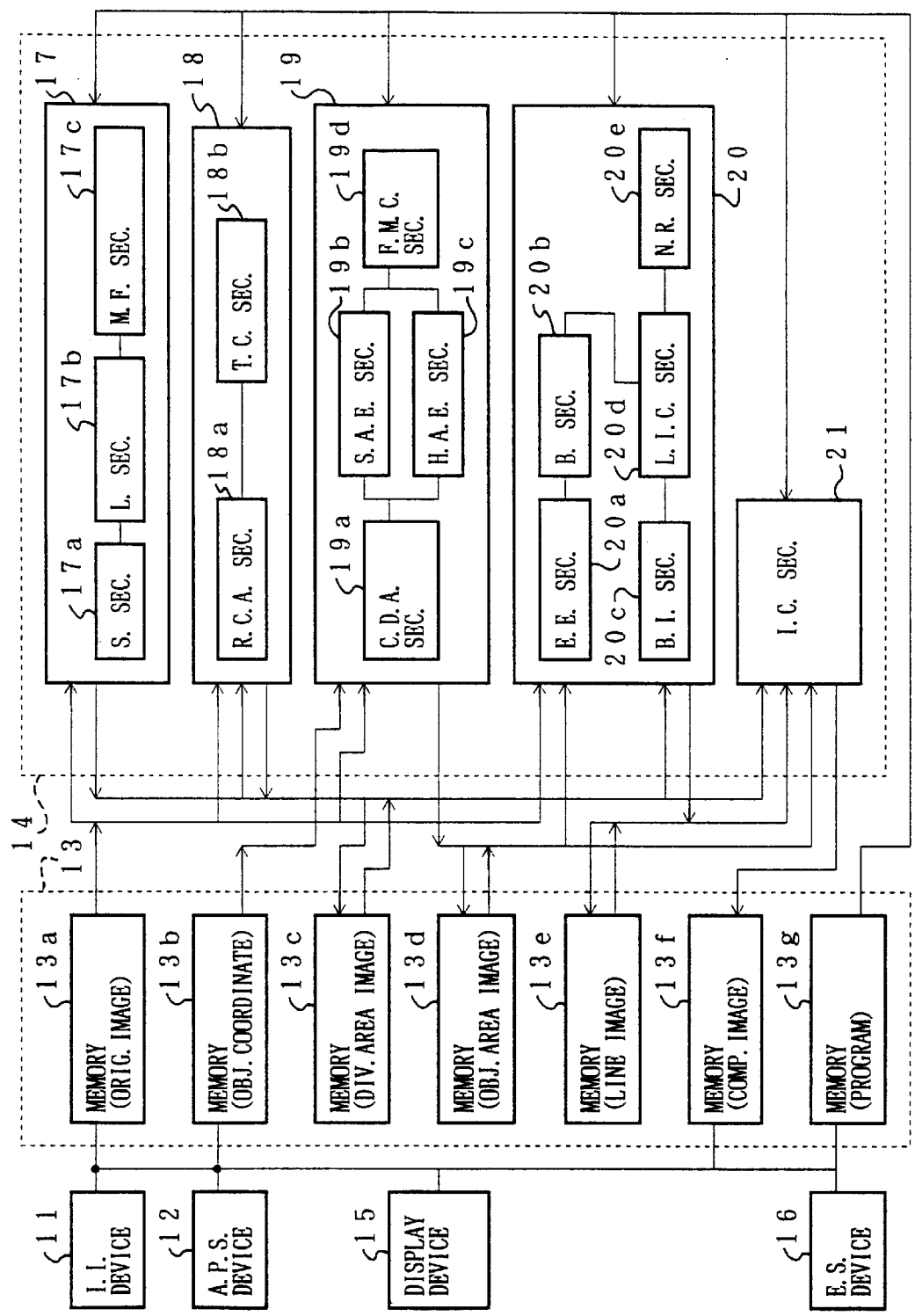
FIG. 1 is a block diagram schematically showing a construction of an image processing device in accordance with one embodiment of the present invention.

Firstly, the following explanation discusses the construction of the present image processing device. As shown in FIG. 1, the image processing device is constituted by an image inputting device(i.i. device)11, an area position specifying device(a.p.s. device)12, a storage device 13, a computing device 14, a display device 15, and an external storage device(e.s. device)16.

The image inputting device 11(image inputting section) is a device for reading a digital signal of the original image (image signal), that is obtained by a photographing device, from a recording medium in which the signal is recorded, so as to transmit the signal to the storage device 13.

The photographing device is for photographing an image light from an object so as to generate an image signal. As the photographing device, it is possible to adopt devices such as a scanner, a digital camera, and a video camera. Further, as the recording medium for recording an image signal, it is possible to adopt devices, which are capable of recording an image signal, including a hard disk, a floppy disk, an optical disk, and a videotape.

The image signal is a digital signal which responds to a two-dimensional image in which a plurality of pixels are arranged in rows and pixel data identifying each pixel are included. The pixel data include positional data for indicating a position of the pixel in the two-dimensional image (coordinate position), and numerical data for indicating a displaying property of the pixel. Further, the numerical data for indicating a displaying property include, for example, a brightness value(brightness data) for indicating brightness for each of monochromatic lights such as red, blue, and green, in the case when the two-dimensional image is a color image.

The display device(image display section)15 is an image display device having a display screen constituted by a cathode-ray tube, a liquid crystal display device, etc. And the display device 15 has a function of displaying an original image which is inputted in the image inputting device 11, and images generated by the computing device 14(described later) and stored in each of the memories of the storage device 13(described later), on the screen.

The area position specifying device(area position specifying section)12 is a pointing device which allows the user to specify an area(temporary object area; first area) including an object to be emphatically converted(object area) in the original image. For example, it is possible to adopt pointing devices such as a mouse, a trackball, and a pen.

Namely, when the user uses the area position specifying device 12 so as to specify a plurality of coordinate positions (area edge coordinate positions) on a display screen which displays the original image, a line connecting the specified coordinates is displayed on the screen and the area, whose edge is constituted by the line, is regarded as a temporary object area. Additionally, the area edge coordinate positions specified by the user are stored in the storage device 13. Further, the edge of the temporary object area, that is obtained by connecting the area edge coordinate positions, is regarded as the object area edge.

The storage device 13 stores information including the original image and area edge coordinate positions. And the storage device 13 is provided with seven storage devices of memories 13a through 13g and memories M1 through M3(not shown) so as to respond to several kinds of information which is to be recorded.

The memory 13a stores the original image(orig. image, original image to be processed) inputted by the image inputting device 11, and the memory 13b stores area edge coordinate positions(obj. coordinate) specified by the user. The user uses the area position specifying device 12 for specifying the area edge coordinate positions.

The memories 13c through 13e respectively store a divided area image(div. area image), an object area image (obj. area image), and a line image(line image), which are intermediately generated upon processing images in the computing device 14(described later). The memory 13f stores a composite image(comp. image) which is achieved by the image processing operation(compositing operation) performed in the computing device 14.

The memory 13g stores programs which are executed in the computing device 14. The detail of these programs will be described later.

The computing device(image compositing section)14 is a device for performing main operations of the present image processing device and is capable of generating an image and performing a compositing operation on an image. Further, as shown in FIG. 1, the computing device 14 is provided with an image dividing section 17, an area color changing section 18, an object area generating section 19, a line image generating section 20, and an image compositing section(i.c. sec.)21.

The image dividing section(subtractive image generating section, second subtractive image generating section, and image dividing section) 17 is constituted by a smoothing section(s. sec.) 17a, a labeling section(l. sec.)17b, and a mode filtering section(m.f. sec.)17c. These sections are used so as to perform an area dividing operation which divides an original image into a plurality of areas. Additionally, the detail of the area dividing operation will be described later.

The area color changing section(subtractive image generating section and second subtractive image generating section)18 is constituted by a representative color acquiring section(r.c.a. sec.)18a and a tone changing section(t.c. sec.) 18b. These sections are used so as to perform an area color changing operation which determines a color for each of the divided areas. Additionally, the detail of the area color changing operation will be described later.

The object area generating section(subtractive image generating section and first subtractive image generating section)19 is constituted by a color distribution acquiring section(c.d.a. sec.)19a, a skin area extracting section(s.a.e. sec., object area extracting section and object area color setting section)19b, a hair area extracting section(h.a.e. sec., object area extracting section and object area color setting section)19c, and a face mask compositing section(f.m.c. sec.)19d. These sections are used so as to perform an object area generating operation which generates an object area image. Additionally, the detail of the object area generating operation will be described later.

The line image generating section 20 is constituted by an edge extracting section(e.e. sec.)20a, a binary section(b. sec.)20b, a boundary image section(b.i. sec.)20c, a line image compositing section(l.i.c. sec.)20d, and a noise removing section(n.r. sec.)20e. These sections are used so as to perform a line image generating operation which generates a line image in accordance with an original image.

The image compositing section 21 performs an image compositing operation in which (a) a divided area image obtained by the image dividing section 17 and the area color changing section 18, (b) an object area image obtained by the object area generating section 19, and (c) a line image obtained by the line image generating section 20 are successively overlaid so as to generate a composite image.

Next, the following explanation describes the image processing operation performed by the present image processing device.

Figure 2:
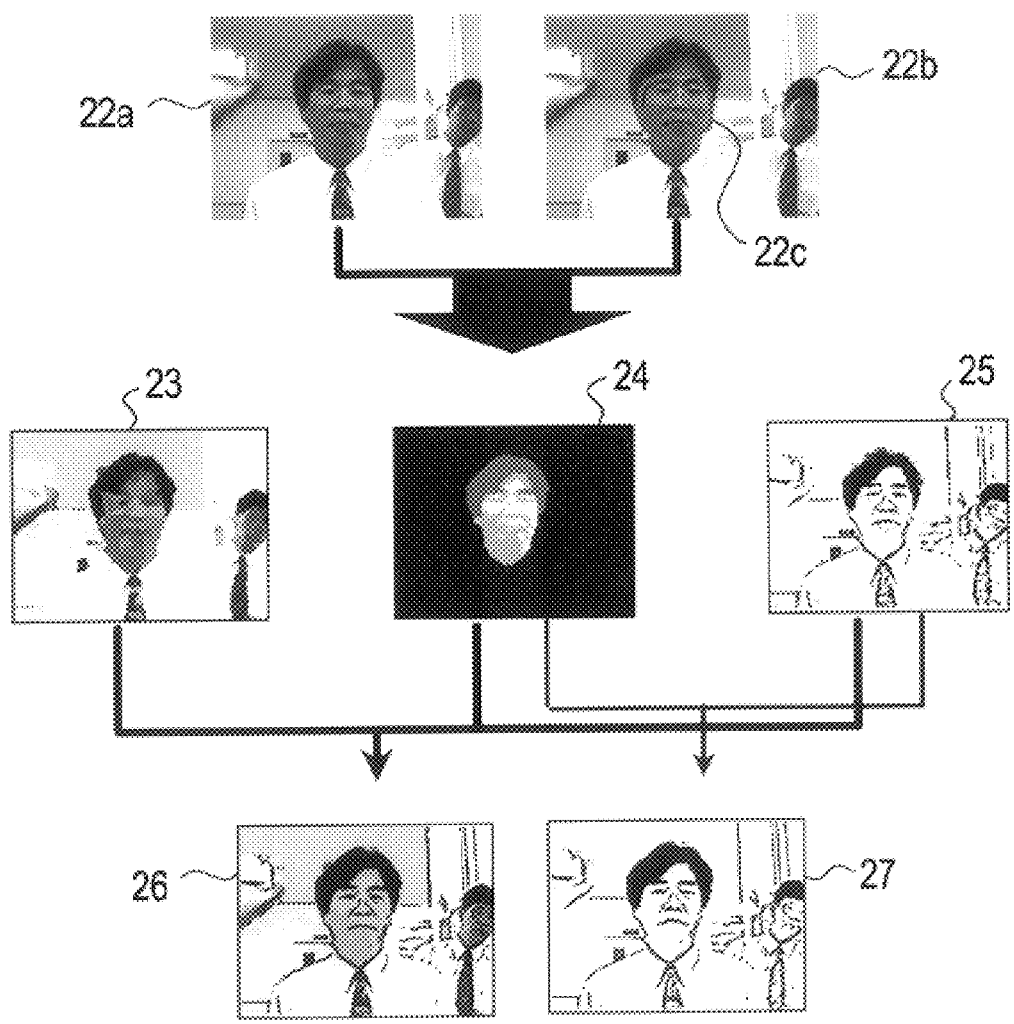
FIG. 2 is an explanatory drawing showing images generated in the respective steps of an image processing operation performed in the image processing device of FIG. 1.
Figure 3:
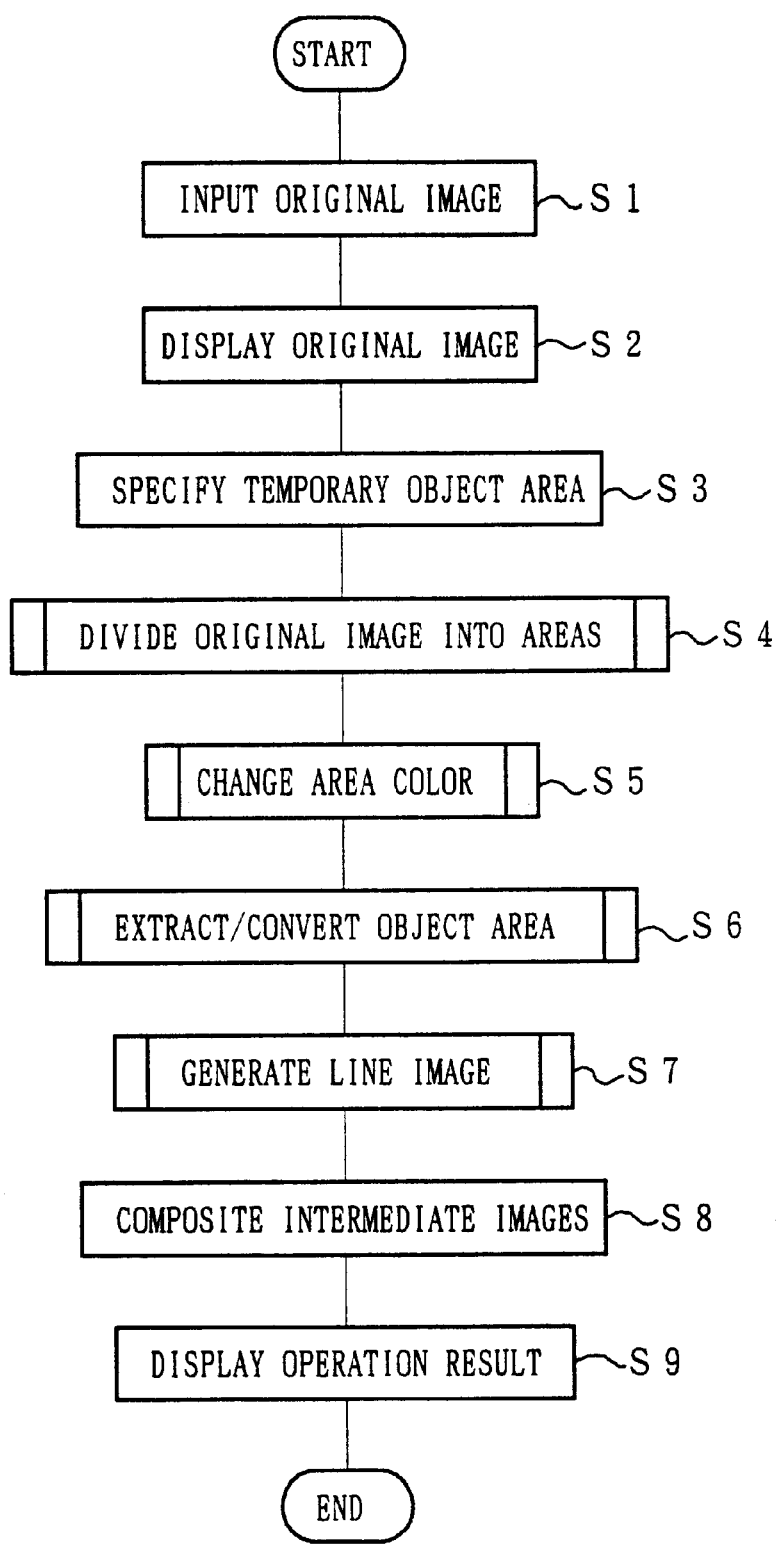
FIG. 3 is a flowchart showing the image processing operation performed in the image processing device of FIG.

Firstly, a flow of the image processing operation is entirely discussed with regard to the present image processing device. FIG. 3 is a flowchart showing the entire flow of the image processing operation. Further, FIG. 2 is an explanatory drawing showing images generated in the respective steps of the image processing operation shown in FIG. 3.

Additionally, the following operation adopts a face of a person as an object to be emphasized in the original image. Specifically, as shown in FIG. 2, an original image 22a is a color photo including a person, and the user specifies the area edge coordinate positions. And then, the present image processing device emphatically converts the face of the person into an illustration image and converts the entire original image 22a into an illustration image so as to achieve operation result images 26 and 27.

As shown in FIG. 3, firstly, an original image is inputted (S1). Specifically, when the image processing operation starts in response to an instruction of the user, the image inputting device 11 inputs the original image 22a from the outside and stores the original image 22a in the memory 13a of the storage device 13.

Next, the original image is displayed(S2). Specifically, the display device 15 displays the original image 22a, which is stored in the memory 13a of the storage device 13, on the screen.

And then, a temporary object area is specified(S3). Specifically, the user uses the area position specifying device 12 so as to specify area edge coordinate positions while looking at the original image 22a displayed on the display device 15. Further, the specified area edge coordinate positions are stored in the memory 13b of the storage device 13 so as to serve as object area information, for example, coordinate rows or two-dimensional image data(mask image).

Moreover, in S3, as shown in the original image 22b of FIG. 2, the display device 15 generates an object area edge 22c in accordance with the specified area edge coordinate positions and displays the object area edge 22c corresponding to the original image. Additionally, the original image 22b is identical with the original image 22a, except that the area edge coordinate positions have been specified.

Next, after the temporary object area information has been stored in the memory 13b, the original image is divided into areas(S4). In this step, the image dividing section 17 reads the original image 22a stored in the memory 13a and performs an area dividing operation. Namely, the image dividing section 17 uses the smoothing section 17a, the labeling section 17b, and the mode filtering section 17c so as to divide an area, in which pixels having similar property values successively exist, as a single area from the original image 22a. Information on the divided area(divided area information) is stored in the memory 13c. The detail of the area dividing operation will be described later.

Successively, an area color is changed(S5). In this step, the area color changing section 18 reads the original image 22a stored in the memory 13a, and the divided area information which is generated in S4 and stored in the memory 13c. And, in accordance with the original image and the information, a color is determined for each of the divided areas. And then, the divided area is painted by using the determined color so as to generate a dividedly converted area image(hereinafter, referred to as a divided area image) 23 shown in FIG. 2. The dividedly converted area image 23 is stored in the memory 13a once again. The detail of the area color changing operation will be described later.

Next, an object area is extracted and converted(object area generating operation)(S6). In this step, the object area generating section 19 reads the original image 22a stored in the memory 13a, and the temporary object area information (area edge coordinate positions) stored in the memory 13b. And then, the object area is extracted and a color is determined for the object area. And the object area generating section 19 paints the object area by using the determined color so as to generate an object area converted image (hereinafter, referred to as an object area image)24 shown in FIG. 2. The object area converted image 24 is stored in the memory 13d. The detail of the object area generating operation will be discussed later.

And then, a line image is generated(S7). In this step, the line image generating section 20 reads the original image 22a stored in the memory 13a, the divided area image 23 generated in S5 and stored in the memory 13c, and the object area image 24 generated in S6 and stored in the memory 13d. And in accordance with these images, a line image 25 shown in FIG. 2 is generated and stored in the memory 13e. The detail of the line image generating operation will be discussed later.

Successively, a composite image of the intermediate images is made(S8). The intermediate images are constituted by the divided area image 23, the object area image 24, and the line image 25. In S8, the image compositing section 21 reads the divided area image 23, the object area image 24, and the line image 25 which are generated in S5 through 7 and stored in the memories 13c through 13e. And then, the images 23 through 25 are successively overlaid and made into a composite image so as to generate the operation result image 26 shown in FIG. 2. Next, the operation result image 26 is stored in the memory 13f. Additionally, since the original image is a color image, the operation result image 26 is a color illustration image. The detail of the image compositing operation will be discussed later.

Finally, the operation result is displayed(S9). Namely, the operation result image 26 generated in S8 is displayed on the display device 15.

Next, the detail is described with regard to each of the operations shown in S4 through S9 of FIG. 3. Additionally, the following explanation mainly describes a case in which an original image(inputted image) is a color image. With regard to a gray scale image, a so-called monochrome image, an additional explanation will be given.

Initially, the following explanation discusses the area dividing operation(S4) performed by the image dividing section 17.

Figure 4:
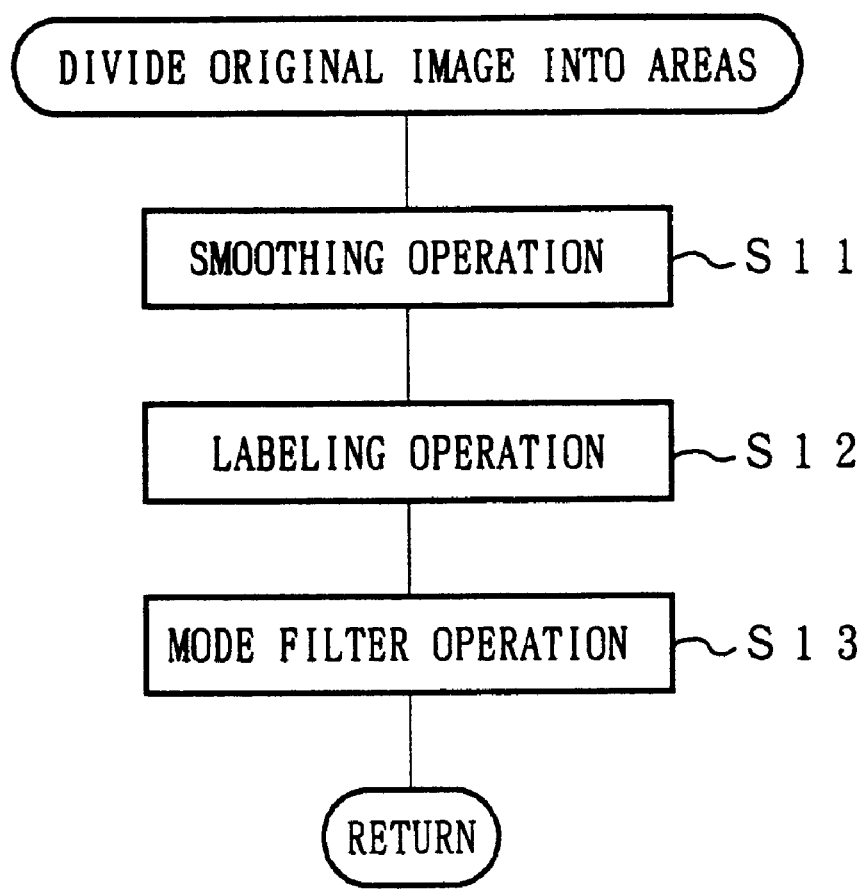
FIG. 4 is a flowchart showing the detail of an area dividing operation performed on an original image in the image processing operation of FIG. 3.

FIG. 4 is a flowchart showing the detail of the area dividing operation. As shown in FIG. 4, in the area dividing operation, a smoothing operation is initially carried out (S11). Namely, in this step, the smoothing section 17a of the image dividing section 17 performs a smoothing operation for each of the pixels of the original image.

The smoothing operation performed by the smoothing section 17a is described as follows: in the original image, each of the pixels normally emits a mixture light of three monochromatic lights including red, blue, and green. Further, upon performing a smoothing operation on a pixel, the smoothing section 17a calculates an average of a brightness value for each of the monochromatic lights with respect to eight pixels(eight adjacent pixels)surrounding the pixel. And then, the average value calculated for each of the monochromatic lights is defined as a brightness value of each monochromatic light of the pixel. Moreover, a brightness value is determined for each of the monochromatic lights with respect to each pixel of the original image so that the original image is entirely subjected to the smoothing operation. Moreover, hereinafter, when the smoothing operation has been performed on all the pixels, the original image is referred to as a smoothed image. Further, the smoothing section 17a generates the smoothed image and stores it in the memory 13c.

Figure 5:
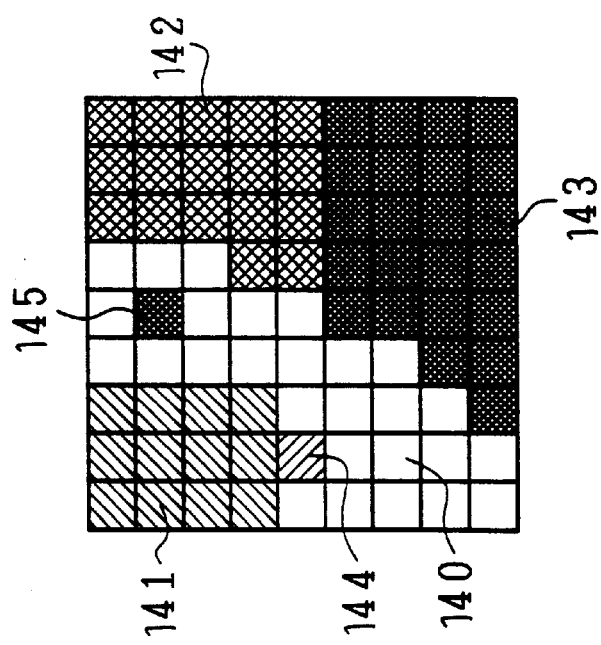
FIG. 5(a) is an explanatory drawing showing a smoothed image which is generated in the area dividing operation performed on the original image of FIG. 3.
FIG. 5(b) is an explanatory drawing showing a first labeled image.
FIG. 5(c) is an explanatory drawing showing a second labeled image.

FIG. 5(a) is an explanatory drawing showing a simple example of a smoothed image. One square corresponds to one pixel(the number of pixels is 9×9). In this example, the smoothing operation divides the original image into six colors by using the smoothing operation. The colors respectively correspond to area 140 through 145. Such a smoothing operation makes it possible to reduce an influence of noise elements which are contained in an image signal of the original image.

Next, a labeling operation is carried out(S12). In this step, the labeling section 17b performs a labeling operation on the smoothed image which is generated in S11.

The labeling operation performed by the labeling section 17b is described as follows: the labeling operation is an operation for labeling pixels with the same area number when the pixels have similar pixel data. This operation is carried out on all the pixels of the smoothed image, pixel by pixel.

Specifically, a color difference is calculated between one pixel and the adjacent pixel, and the color difference is compared with a predetermined reference color difference. When the calculated color difference is not less than the reference color difference, it is understood that these pixels belong to different areas so as to be given area numbers which are different from each other. In contrast, when the calculated color difference is less than the reference color difference, it is understood that these pixels belong to the same area so as to be given the same area number. Further, when all the pixels are labeled with area numbers in the smoothed image, the labeling operation is completed. Additionally, the area numbers of all the pixels are stored in the memory 13c as pixel data.

Such a labeling operation allows each pixel of the smoothed image to belong to one of the areas, which are arranged in a predetermined number. Hereinafter, when each of the pixels is labeled with an area number, the smoothed image is referred to as a first labeled image.

FIG. 5(b) is an explanatory drawing showing the first labeled image which is generated by performing the labeling operation on the smoothed image shown in FIG. 5(a). In the example shown in this figure, in each of the areas 140 through 145 generated by the smoothing operation, the pixels are labeled with the same area number. Namely, a pixel belonging to the area 140 is labeled with an area number "3", a pixel belonging to the area 141 is labeled with an area number "1", a pixel belonging to the area 142 is labeled with an area number "4", a pixel belonging to the area 143 is labeled with an area number "6", a pixel belonging to the area 144 is labeled with an area number "2", and a pixel belonging to the area 145 is labeled with an area number "5".

Additionally, the color difference can be determined by, for example, the following calculations ① and ②. ① With respect to a brightness value for each of the monochromatic lights in each of the pixels, subtraction is carried out between the pixels so as to calculate a difference value. ② The total difference value of the respective monochromatic lights is determined as a color difference.

Next, a mode filtering operation is carried out(S13). In this step, the mode filtering section 17c integrates minute areas located in the first labeled image with the adjacent areas. The first labeled image is obtained in S12.

The following explanation describes a method for integrating a minute area. The mode filtering section 17c is arranged so as to replace an area number of a pixel, which forms a minute area in the first labeled image, with an area number whose appearance frequency is the highest among the area numbers of the surrounding pixels. Namely, the mode filtering section 17c replaces an area number of a pixel belonging to a minute area with an area number which belongs to the surrounding pixels in the largest number.

This method makes it possible to remove extremely small areas so as to allow the first labeled image to be constituted merely by relatively large areas. A minute area can be corrected into a suitable color. Additionally, area numbers of all the pixels are stored in the memory 13c as pixel data. Further, hereinafter, the first labeled image which has been subjected to the mode filtering operation is referred to as a second labeled image. Furthermore, in the second labeled image, an area whose pixels are labeled with the same area number is referred to as a divided area.

FIG. 5(c) is an explanatory drawing showing the second labeled image which is generated by performing the mode filtering operation on the first labeled image shown in FIG. 5(b). In the labeling operation of S12, one pixel belonging to the area 144 is labeled with the area number "2" and one pixel belonging to the area 145 is labeled with the area number "5". And then, as shown in the example of this figure, these two pixels are offered the area number "3" of the area 140, which is adjacent to the pixels.

Upon completion of the operation of S13, the operation of S4 in FIG. 3, namely, the area dividing operation is completed, and the process moves on to an area color changing operation performed in S5 of FIG. 3.

The following explanation describes the area color changing operation.

In this operation, the area color changing section 18 determines a color(area color) for each of the divided areas in accordance with the original image and the second labeled image generated in S4. And the area color changing section 18 paints the divided areas by using the determined colors so as to generate a divided area image.

Figure 6:
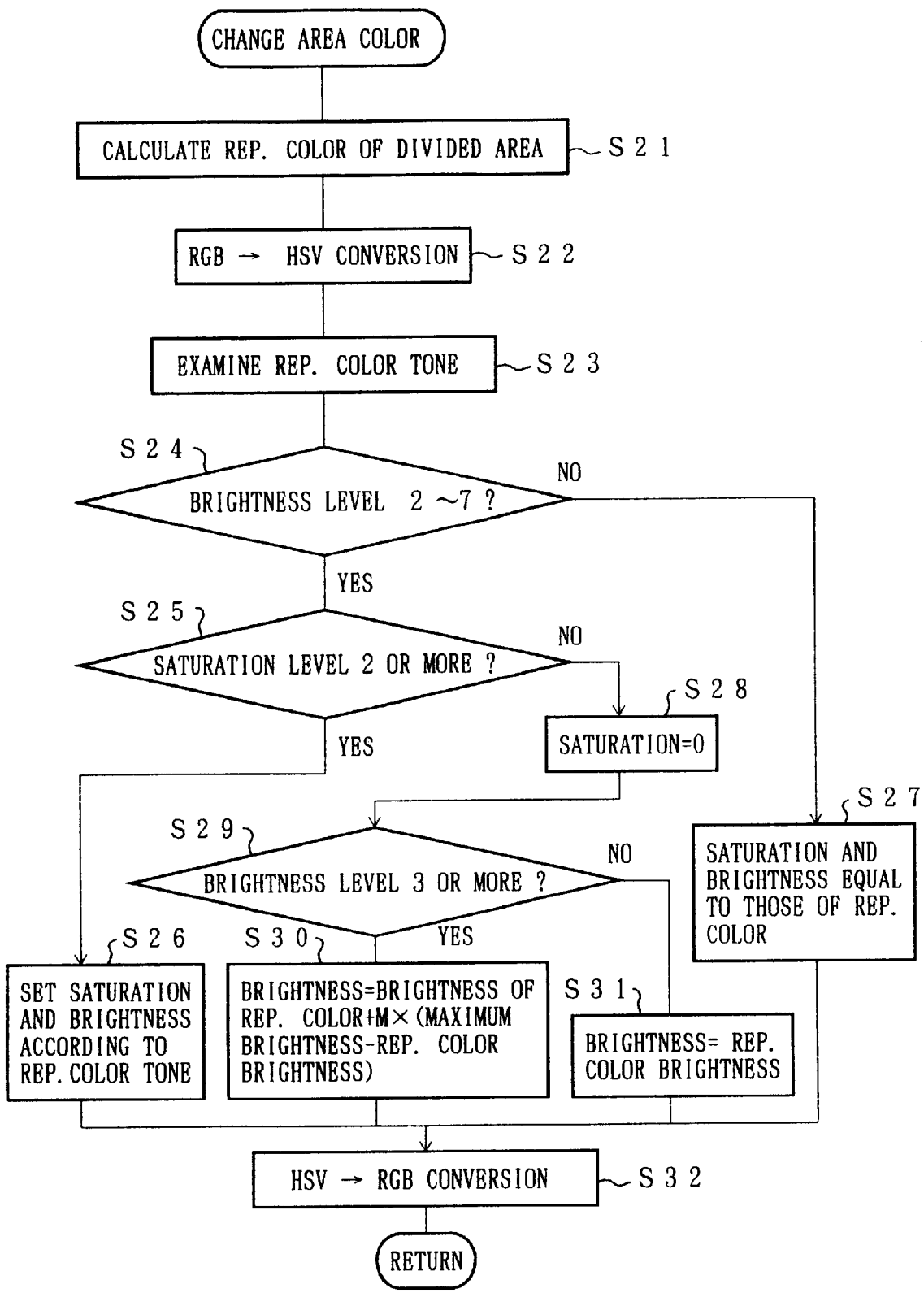
FIG. 6 is a flowchart showing the detail of an area color changing operation performed in the image processing operation of FIG. 3.

The following explanation describes a specific method for determining the area color. FIG. 6 is a flowchart showing a flow of the area color changing operation performed in the area color changing section 18. As shown in FIG. 6, in this operation, a color representing each of the divided areas (representative color) is initially calculated(S21). In this step, the representative color acquiring section 18a of the area color changing section 18 calculates pixel data of the representative color for each of the divided areas in accordance with the original image stored in the memory 13a and the second labeled image acquired in the image dividing section 17.

Specifically, it is possible to calculate pixel data of the representative color for each of the divided areas by using the following steps ① through ③. ① Prior to the operation of S11(in the original image), with respect to a brightness value of each of the pixels located in the divided area, the average is calculated for each of the monochromatic lights including red, blue, and green. ② The average brightness value for each of the monochromatic lights is determined to be a brightness value of each of the monochromatic lights in the divided area. ③ These brightness values are determined to be pixel data of the representative color.

Next, a conversion from RGB to HSV is carried out(S22) This step acquires HSV data of the representative color for each of the divided areas. Namely, pixel data of the representative color constituted by the brightness values of red, blue, and green(RGB) are converted into data(HSV data) constituted by a hue, saturation, and brightness.

Successively, the tone changing section 18b examines a tone of the representative color(S23). In accordance with saturation and brightness of each of the representative colors, in a space having axes of saturation and brightness, this step specifies a partial space(area) where each of the representative colors belongs. Hereinafter, an entire space having the axes of saturation and brightness is defined as a tone space, and a partial space of the tone space is defined as a tone.

Figure 7:
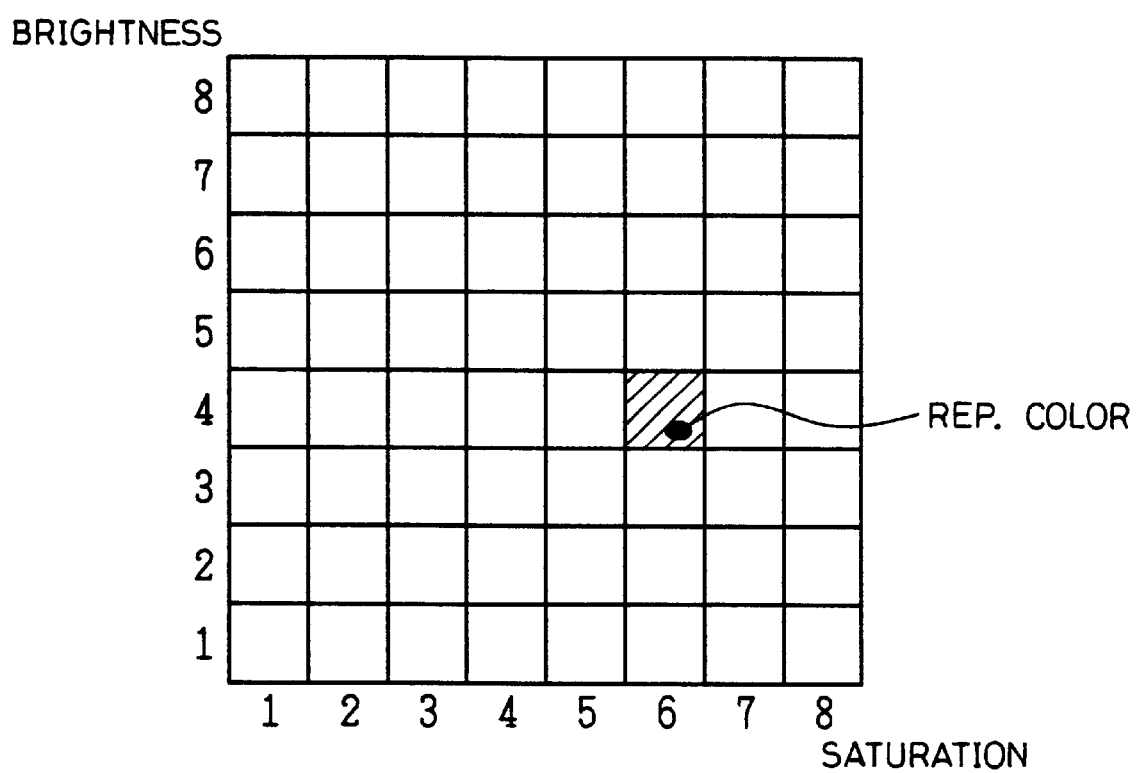
FIG. 7 is an explanatory drawing showing a tone of a representative color.

FIG. 7 is an explanatory drawing showing a tone space of the present image processing device. As shown in FIG. 7, in the tone space, scales of brightness and saturation are evenly divided into levels 1 through 8. Therefore, the tone space is divided into 64 partial spaces, namely, tones, and each of the tones has any one of 1 through 8 brightness values and any one of 1 through 8 saturation values.

Therefore, with regard to the representative color of each of the divided areas, if the saturation and brightness values, which have been acquired in S22, are respectively indicated in any one of levels 1 through 8, the representative color is allowed to belong to one of the tones in the tone space.

For instance, when the representative color of one of the divided areas has saturation of 0.7 and brightness of 0.4 at a saturation and brightness scale of 1, it is understood that the representative color belongs to a tone having a saturation level 6 and a brightness level 4(diagonally shaded area in FIG. 7).

Next, with respect to a tone of the representative color of each of the divided areas, the tone changing section 18b makes a judgement on whether the brightness level ranges from 2 to 7(between 2 and 7) or not(S24). Here, when the brightness level of the representative color is within this range, the process moves on to S25; meanwhile, when the brightness level is out of the range, the process moves on to S27.

In S25, with regard to the representative color examined in S24, the tone changing section 18b makes a judgement on whether the saturation level of the tone is less than 2 or not in each of the divided areas. And then, when the saturation level is not less than 2, the process moves on to S26; otherwise, the process moves on to S28.

In S26, in accordance with the tone of the representative color of each of the divided areas, the tone changing section 18b determines saturation and brightness values with regard to the area color of each of the divided areas.

As shown in FIGS. 8(a) through 8(c), for example, in a specific method, a tone having one-step higher saturation and brightness levels are acquired in accordance with the tone of the representative color. And then, the maximum values of saturation and brightness of the tone are defined as the saturation value and brightness value of the area color.

Namely, in a tone space shown in FIG. 8(a), when the representative color has a saturation level of 6 and a brightness level of 4, a tone having one-step higher saturation and brightness level(saturation level 7 and brightness level 5) is acquired as shown in FIG. 8(b). Further, as shown in FIG. 8(c), within the range of the tone(saturation level 7 and brightness level 5) shown in FIG. 8(b), the maximum saturation and brightness values are regarded as a saturation value and a brightness value of the area color. With this method, the area color can be changed into a color which is brighter than the representative color. In FIG. 8(c), • indicates the position of the area color in the tone space.

Further, another method can be adopted for determining saturation and brightness values in accordance with a tone. For example, it is possible to define another higher tone space which has fewer division levels. Further, with regard to the tone of the higher tone space, it is possible to define the maximum saturation and brightness values as a saturation value and a brightness value of the area color.

In other words, in accordance with the tone space shown in FIG. 9(a), the higher tone space shown in FIG. 9(b) is arranged so as to determine another tone where the representative color belongs in the tone space. Moreover, as shown in FIG. 9(c), with regard to a newly acquired tone, the maximum saturation and brightness values are defined as a saturation value and a brightness value of the area color. In FIG. 9(c), • indicates the position of the area color in the higher tone space.

This method makes it possible to entirely unify shades of the area colors of the divided areas in the image.

Meanwhile, in S24, in the case when the brightness level of the representative color is not between 2 and 7, the tone changing section 18b defines the saturation value and brightness value of the representative color as a saturation value and brightness value of the area color(S27). Namely, when the brightness level of the representative color is extremely high or low, the representative color is adopted as the area color.

With this method, even when the brightness level of the representative color is extremely high(or low) so that the saturation tends to fluctuate, it is possible to prevent an unnecessary color change. And then, upon completion of the operation of S27, the process moves on to S32.

Further, in S28, the tone changing section 18b unconditionally sets the saturation value of the area color at 0. Namely, if the representative color has low saturation, the area color of the divided area is defined as an achromatic color. The representative color belongs to the divided area. With this method, a color, which is close to an achromatic color and is readily perceived by a person, is completely handled as an achromatic color; thus, it is possible to prevent an unnecessary color change.

And, upon completion of the operation of the S28, the process moves on to S29. In this step, the tone changing section 18b judges whether the brightness of the tone of the representative color is less than 3 or not. If the brightness is not less than 3, the process moves on to S30; otherwise, the process moves on to S31.

In S30, the tone changing section 18b calculates a brightness value of the area color with regard to each of the divided areas of the representative color as follows: the brightness value of the representative color+M×(the maximum brightness value−the brightness value of the representative color), where $0<M\leq 1$.

With this method, when the representative color has a certain brightness values, the brightness value is increased and the representative color is changed into a brighter achromatic color. Upon completion of S30, the process moves on to S32.

Meanwhile, in S31, the tone changing section 18b adopts the brightness value of the representative color as a brightness value of the area color. Namely, when the saturation is low and the brightness is not so high with regard to the representative color, the representative color is changed into an achromatic color without changing the brightness value. With this method, for example, when the representative color is close to black, the area color is changed into an achromatic color having no saturation, while keeping the black color of the representative color. Upon completion of the operation of S31, the process moves on to S32.

In S32, the tone changing section 18b carries out an HSV→RGB conversion. Namely, in this step, a hue of the area color is defined as the hue of the representative color with regard to each of the divided colors. And HSV data are converted into a brightness value(RGB data) of each of the monochromatic lights(red, green, and blue). The HSV data are constituted by the hue, and the saturation value and brightness value of the area color that have been acquired in the aforementioned steps. Hereinafter, when a color is shown by using a brightness value of each of the converted monochromatic lights, the color is referred to as the area color.

The above-mentioned step completes the process of the flow chart in FIG. 6, and the area color, which paints each of the divided areas, is determined. The area color is determined for each of the divided areas. The determined area color paints the area which corresponds to the area position of the labeled image so as to generate a divided area image. Additionally, all information of the divided area image is stored in the memory 13c of the storage device 13.

Upon completion of generation of the divided area image, S5 of FIG. 3 is completed, and the process moves on to S6 of FIG. 3.

The following explanation discusses the object area generating operation(extracting/converting object area) performed in S6.

In this operation, the object area generating section 19 extracts an object area in accordance with the original image and information on the temporary object area, that includes the area edge coordinate positions. The object area generating section 19 further determines a color of the object area. And then, the inside of the extracted area is painted by using the determined color so as to generate an object area image(object mask image).

Here, the following explanation will describe the detail of a specific method for generating the object area image. In the present image processing device, the color distribution acquiring section 19a of the object area generating section 19 previously analyzes a color distribution of a variety of objects and stores the analysis in a predetermined storage section(not shown). Initially, the steps of the analysis are described.

Figure 11A:
FIG. 11(a) is an explanatory drawing showing an original image including a face of a person.
Figure 11B:
FIG. 11(b) is an explanatory drawing showing the original image in which merely a face is extracted.

1. From an image including one object, an area, which is constituted by the most dominant color(dominant area) in each of the objects, is extracted. For instance, with respect to the original image shown in FIG. 11(a), in the case when the face is selected as an object as shown in FIG. 11(b), it is understood that the dominant color is a flesh color. Namely, the dominant color is one type of color which represents a color of the object.

Figure 12A:
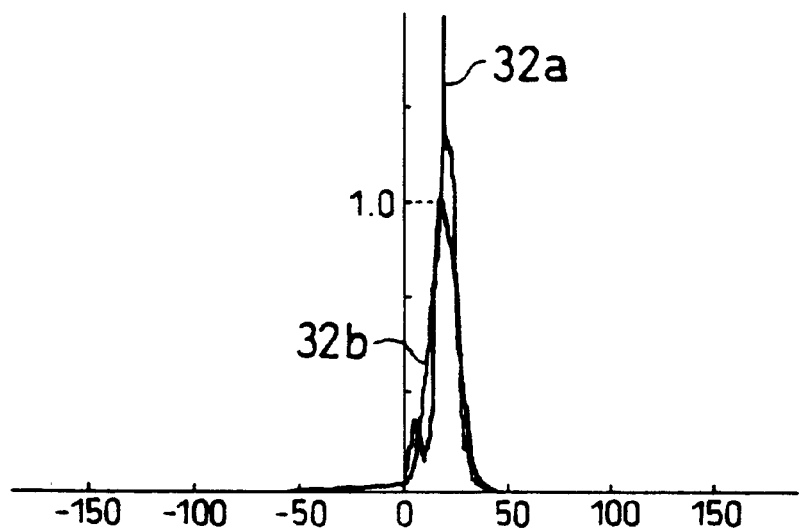
FIG. 12(a) is a graph showing a hue histogram.
Figure 12B:
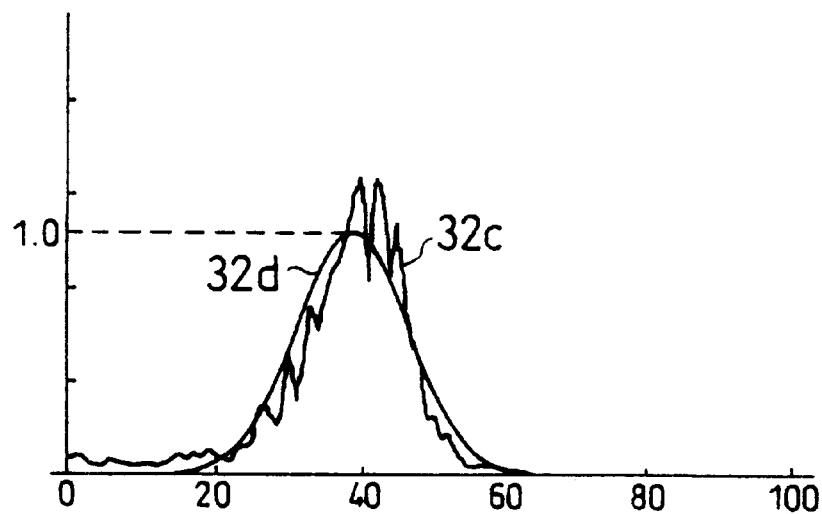
FIG. 12(b) is a graph showing a saturation histogram.
Figure 12C:
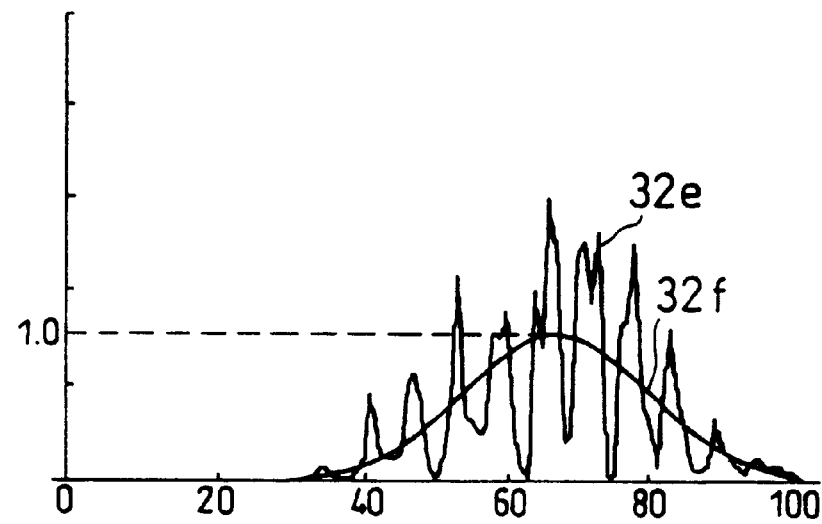
FIG. 12(c) is a graph showing a lightness histogram.

2. With regard to pixels located in the dominant area, FIG. 12(a) through 12(c) show the color distributions as occurrence frequency histograms. Namely, a curve 32a of FIG. 12(a) is a hue histogram, a curve 32c of FIG. 12(b) is a saturation histogram, and a curve 32e of FIG. 12(c) is a lightness histogram.

3. The distribution average and distribution dispersion are found in each histogram, and a normal probability intensity function (equation(1) mentioned later) is determined so as to be the most suitable function for the distribution. The normal probability intensity functions of the hue, saturation, and lightness are respectively shown by a curve 32b of FIG. 12(a), a curve 32d of FIG. 12(b), and a curve 32f of FIG. 12(c).

4. In the same manner, the normal probability intensity functions are made for a number of objects.

As described above, in this analysis, a color distribution of one object is indicated by the normal probability intensity functions(Phue(x), Psat(x), and Pval(x)), in which a hue, saturation, and lightness are indicated by the two arguments of the average value and dispersion(respectively, $\mu$hue, $\sigma$hue$^2$, $\mu$sat, $\sigma$sat$^2$, $\mu$val, and $\sigma$val$^2$) (equations (2) through (4)). And, equations (5) through (7) are referred to as object area probability intensity functions which are respectively offered a hue, saturation, and lightness.

$$P(x) \sim N(\mu, \sigma^2) \equiv P(x) = 1/(2\pi^{(1/2)}) * \exp(-((x-\mu)^2)/(2\sigma^2)) \quad (1)$$

$$P\text{hue}(x) \sim N(\mu\text{hue}, \sigma\text{hue}^2) \quad (2)$$

$$P\text{sat}(x) \sim N(\mu\text{sat}, \sigma\text{sat}^2) \quad (3)$$

$$P\text{val}(x) \sim N(\mu\text{val}, \sigma\text{val}^2) \quad (4)$$

$$F\text{hue}(x) = P\text{hue}(x)/P\text{hue}(\mu\text{hue}) \quad (5)$$

$$F\text{sat}(x) = P\text{sat}(x)/P\text{sat}(\mu\text{sat}) \quad (6)$$

$$F\text{val}(x) = P\text{val}(x)/P\text{val}(\mu\text{val}) \quad (7)$$

Additionally, according to equation (1), P(x) follows $N(\mu, \sigma^2)$, which means that $P(x)=1/(2\pi^{(1/2)}) * \exp(-((x-\mu)^2)/(2\sigma^2))$ is established.

Next, the following explanation describes a flow of the object area extracting operation. Additionally, the operation is carried out by the face skin extracting section 19b of the object area generating section 19.

FIG. 10 is a flowchart showing a flow of this operation. As shown in this figure, in this operation, an operation target area is initially set(S41).

Figure 13A:
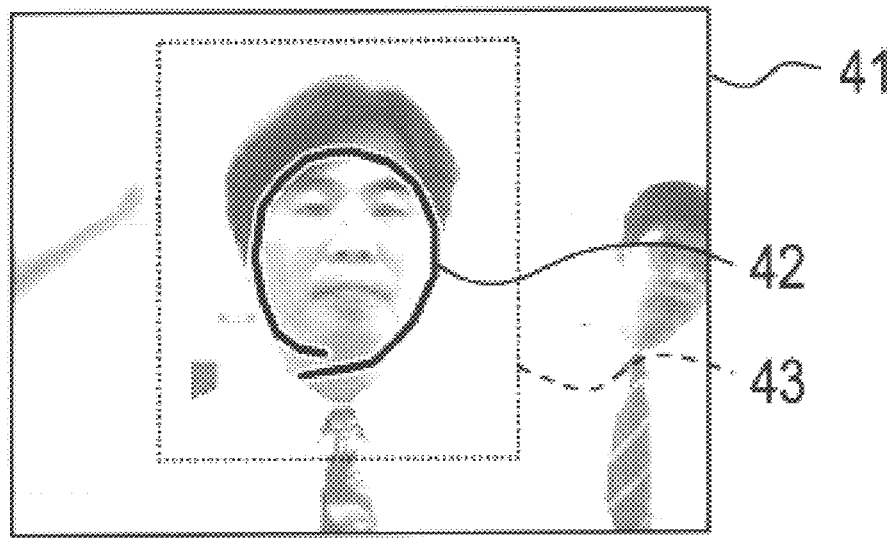
FIG. 13(a) is an explanatory drawing showing the original image in which an object area edge is arranged so as to include the face.

This setting is made in accordance with the object area edge 22c(shown in FIG. 2) which is inputted by the user. Additionally, as described above, in the present embodiment, an object to be emphasized is a face of a person in the original image. Therefore, as shown in FIG. 13(a), in accordance with an original image 41, the object area edge 22c is arranged so as to include the face.

Figure 13B:
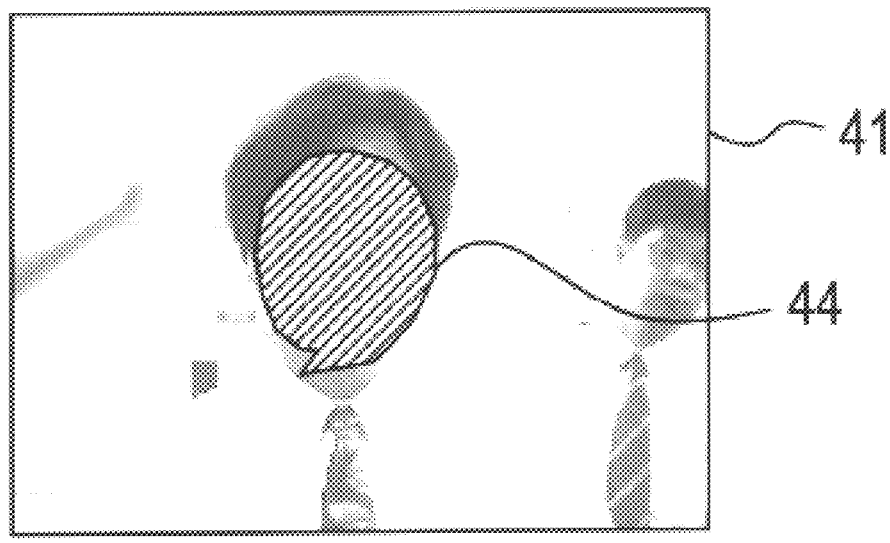
FIG. 13(b) is an explanatory drawing showing an input mask area which is arranged in accordance with the object area edge shown in FIG. 13(a).

Upon setting the object target area, initially, a rectangle is arranged so as to be circumscribed around the object area edge 22c. And then, all the sides of the rectangular are expanded in the respective directions so as to form a rectangular area serving as an operation target area 43. Moreover, hereinafter, a temporary object area surrounded by the object area edge 22c is referred to as an input mask area 44(shown in FIG. 13(b)).

Next, a possible object area pixel is selected(S42) In this step, hue, saturation, and lightness are found for each of the pixels in accordance with the RGB brightness value of each of the pixels in the operation target area 43. Further, the hue, saturation, and lightness are adopted as arguments so as to be substituted into the normal probability intensity functions (the aforementioned equations (2) through (4)), thereby determining values of three functions of Fhue(x), Fsat(x), and Fval(x). Afterwards, a pixel, which allows each of the function values to be at a certain threshold value or more, is chosen as a possible object area pixel.

Here, the values are applied to the above-mentioned equations (2) through (4) so as to offer a possibility that each of the pixels may constitute the object area(object area pixel). Moreover, it is preferable to set the threshold value at a minimum value(for example, 5%), because a color distribution of the possible object area pixel is set as large as possible.

As described above, in the operation target area 43 which is specified by the user, a pixel which has a possibility of constituting the object is allowed to be one of the possible object area pixels even if the possibility is small.

Successively, among the possible object area pixels, with regard to the pixels located in the input mask area 44, the average and dispersion of the hue, saturation, and lightness ($\mu$hue', $\sigma$hue$^{2'}$, $\mu$sat', $\sigma$sat$^{2'}$, $\mu$val', and $\sigma$val$^{2'}$) are calculated (S43). With this arrangement, new possibility intensity functions (Phue'(x), Psat'(x), and Pval'(x)) are respectively defined as follows(equations(8) through (10)) with the hue, saturation, and lightness serving as arguments. And then, it is possible to define equations (11) through (13) as new object area possibility intensity functions, and to select object area pixels by using these functions.

$$P\text{hue}'(x) \sim N(\mu\text{hue}', \sigma\text{hue}^{2'}) \quad (8)$$

$$P\text{sat}'(x) \sim N(\mu\text{sat}', \sigma\text{sat}^{2'}) \quad (9)$$

$$P\text{val}'(x) \sim N(\mu\text{val}', \sigma\text{val}^{2'}) \quad (10)$$

$$F\text{hue}'(x) = P\text{hue}'(x)/P\text{hue}'(\mu\text{hue}') \quad (11)$$

$$F\text{sat}'(x) = P\text{sat}'(x)/P\text{sat}'(\mu\text{sat}') \qquad (12)$$

$$F\text{val}'(x) = P\text{val}'(x)/P\text{val}'(\mu\text{val}') \qquad (13)$$

Next, an object area pixel is selected(S44). The selection is made as follows:

1. Among all the pixels included in the operation target area 43, a pixel is removed if the object area possibility (Fhue'(x)), which is obtained with a hue value serving as an argument, is not more than a predetermined threshold value.

2. Next, a pixel is removed if the object area possibility (Fsat'(x)), which is obtained with a saturation value serving as an argument, is not more than a predetermined threshold value.

3. Finally, a pixel is removed if the object area possibility (Fval'(x)), which is obtained with a lightness value serving as an argument, is not more than a predetermined threshold value.

Here, the lower limit of the possibility of serving as a threshold value is set larger(for example, 30%) than the threshold value which is obtained when the possible object area pixel is found in S42. With this arrangement, even if a pixel is improperly extracted as a noise when the possible object area pixel (possible face skin pixel) is found in S42, it is possible to prevent the pixel from being extracted as a pixel constituting the object area.

As described above, the object area possibility intensity functions are properly revised so that the object area pixels can be suitably selected. Further, an image constituted merely by the object area pixels is generated so as to achieve an object area extracted image from the original image shown in FIG. 15(*a*), as shown in FIG. 15(*c*).

Figure 15A:
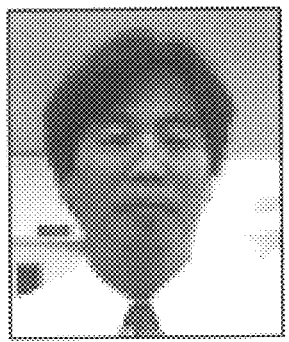
FIG. 15(a) is an explanatory drawing showing the original image including the face.
Figure 15B:
FIG. 15(b) is an explanatory drawing showing an object area extracted image generated by a fixed function.
Figure 15C:
FIG. 15(c) is an explanatory drawing showing an object area extracted image generated by an object area possibility intensity function which is suitably revised.

Additionally, the conventional extracting method using fixed functions makes it possible to obtain an object area extracted image shown in FIG. 15(*b*). Therefore, the object area extracted image shown in FIG. 15(*c*), that is obtained by the method of the present invention, has an advantage of less improper extraction caused by a noise, as compared with the object area extracted image shown in FIG. 15(*b*), that is obtained by the conventional extracting method using the fixed functions.

Next, an object area image is generated(S45).

FIG. 16 is a flowchart showing an operation for generating an object area image.

Upon generating the object area image, initially, a hole-filling operation is carried out on the object area extracted image(S51). In this step, the object area pixels obtained in S44 are defined as white pixels and the other pixels are defined as black pixels so as to generate a monochrome image shown in FIG. 17(*a*).

Moreover, in this image, the black pixels(holes) surrounded by the white pixels are replaced by the white pixels so as to obtain an image in which holes are filled, namely, an image shown in FIG. 17(*b*).

Next, a minute area is removed(S52). In this operation, a constricting operation is carried out once or more so as to obtain an image in which minute areas are removed, namely, an image shown in FIG. 17(*c*).

Successively, some areas are removed(S53). In this operation, firstly, adjacent object area pixels are combined to each other so as to divide object area pixels into one or more areas. Moreover, an area whose ratio(area sharing ratio) is small in the input mask area 44 is removed so as to generate an image shown in FIG. 17(*d*). Additionally, the operation performed in S53 will be described later.

Furthermore, the object area is extracted(S54). In this operation, the image shown in FIG. 17(*d*) expands once or more so as to obtain an image shown in FIG. 17(*e*). In this image, an area constituted by white pixels is an object area.

Successively, the extracted object area is painted by using a color predetermined in accordance with the object so as to generate an object area image(S55). Namely, a color which is natural as a face is experimentally determined, and the object area is painted by using the color so as to generate an object area image.

Here, the operation performed in S53 is discussed. Firstly, it is assumed that an image shown in FIG. 18(*a*) is obtained as the object area extracted image. This image includes five areas 51 through 55. Further, it is assumed that an input mask area is an image of FIG. 18(*b*). And, an image of FIG. 18(*c*) shows the state in which the object area extracted image of FIG. 18(*a*) overlaps the input mask area of FIG. 18(*b*).

In this case, the areas 52 and 54 of FIG. 18(*a*) are included in the input mask area so that the ratio of an area shared with the input mask area is 1.0. Meanwhile, the area 55 does not overlap the input mask area at all; thus, the area sharing ratio is 0.0.

Additionally, the area 53 is virtually located inside the input mask area so that merely a small portion is located outside the input mask area. Therefore, the area 53 has a high area sharing rate. In contrast, merely a small portion of the area 51 is located inside the input mask area so that the area 51 is virtually located outside the input mask area; the area sharing rate is low.

Here, when an area "r" has an area sharing rate S(r), the area sharing rate S(r) is defined by using the following equation(14).

$$S(r) = \text{Area}(\text{Inmask} \ \& \ r)/\text{Area}(r) \qquad (14)$$

Here, Inmask represents the input mask area, Area(x) represents the area of an area x, & represents an AND. In other words, in S53, the area sharing rate S is calculated for each of the areas. Unless the area sharing rate S exceeds a certain threshold value, the areas are removed. This arrangement makes it possible to allow a group of the object area pixels to be formed into a shape which is close to the shape of the input mask area. With this arrangement, it is possible to obtain an image shown in FIG. 18(*d*).

Upon completion of generating the object area image, S6 of FIG. 3 is completed and the process moves on to a line image generating operation performed in S7 of FIG. 3.

Next, the line image generating operation is discussed. In this operation, the line image generating section 20 generates a line image from the original image, the divided area image generated in S4 of FIG. 3, and the object area image generated in S6.

FIG. 23 is a flowchart showing a flow of the line image generating operation. As shown in this figure, in this operation, the edge extracting section 20*a* of the line image generating section 20 generates an edge image from the original image and the object area image(S61).

Figure 24:
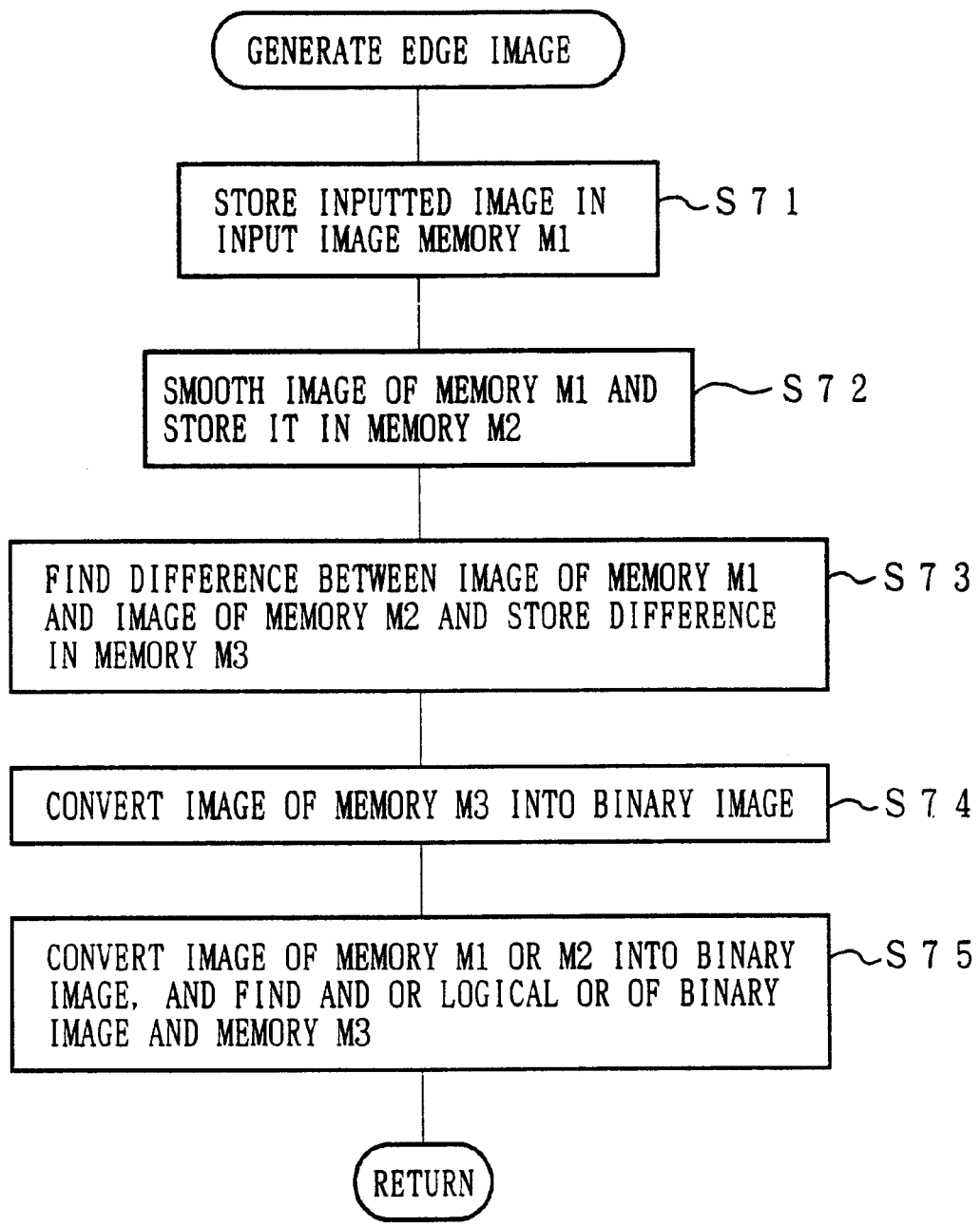
FIG. 24 is a flowchart showing an edge image generating operation performed in the line image generating operation of FIG. 23.

Here, a method for generating an edge image is specifically described. FIG. 24 is a flowchart showing an operation for generating an edge image. As shown in this figure, upon generating an edge image, the memory M1 of the memory device 13 is used for storing the original image. Furthermore, the memory M2 is used for storing the smoothed image, and the memory M3 is used for storing an outputted image.

Firstly, the edge extracting section 20*a* reads the original image from the memory 13*a* and stores the original image in the memory M1(S71). In this step, with respect to an image(Y by X matrix of pixels), the memory M1 successively stores brightness values from upper left to lower right pixels.

Namely, a brightness value V of a coordinate(x, y) is stored in the (x+X×y)th place of the memory M1. Therefore, it is desirable that the memory M1 offer a memory capacity of (X×Y)byte or more for each image(ditto for the memories M2 and M3).

Additionally, when RGB respectively has the brightness values of r, g, and b, the brightness value V is determined by the calculation of: V=0.30×r+0.59×g+0.11×b. Further, the brightness value V is represented by 1 byte(=8 bit) for one pixel; thus, the brightness value V ranges from 0 to 255.

Next, the edge extracting section 20a performs a smoothing operation on the brightness value V of the memory M1 and stores the brightness value V in the memory M2(S72). Namely, in this step, the edge extracting section 20a performs a smoothing operation on the original image in accordance with the brightness value V stored in the memory M1. Specifically, when a coordinate(x, y) of the original image has a brightness value V of M1(x, y), the following calculation is performed:

$$(M1(x-3, y-3)+M1(x, y-3)+M1(x+3, y-3)+M1(x-3, y)+M1(x, y)+M1(x+3, y)+M1(x-3, y+3)+M1(x, y+3)+M1(x+3, y+3))/9=M2(x, y),$$

and the obtained value is stored in (x+X×y) th place of the memory M2. The same operation is carried out for each of the pixels of the original image.

This smoothing operation makes it possible to determine the average of one pixel and the others being disposed longitudinally, laterally, and diagonally; thus, unlike the conventional edge extracting method which detects an edge by using the Sobel filter, the result does not depend upon the direction of the pixel intensity gradient.

Moreover, the target pixels of the smoothing operation are not limited to the above-mentioned nine pixels. It is possible to extend or narrow the range of the target pixels.

Successively, the edge extracting section 20a calculates a difference between the brightness value M1(x, y) stored in the memory M1 and the brightness value M2(x, y) stored in the memory M2, determines a brightness value of each of the pixels in accordance with the difference, and stores the brightness value in the memory M3 as M3(x, y)(S73). Namely, in this step, the edge extracting section 20a finds a difference between the brightness values before and after the smoothing operation.

Specifically, as for a coordinate(x, y), M1(x, y) of the memory M1 is compared with M2(x, y) of the memory M2. When M1(x, y)≧M2(x, y), M3(x, y)=255. And when M1(x, y)<M2(x, y), M3(x, y)=255−(M2(x, y)−M1(x, y)). This operation is performed for each of the pixels in the image.

Another method may be adopted as follows: an absolute value of a brightness value difference is found between the memory M1 and the memory M2. However, in this method, as for a dark pixel disposed in the vicinity of a bright pixel and a bright pixel disposed in the vicinity of a dark pixel, a difference value is large. Therefore, an edge area determined by a binary operation, which is described later, is detected larger as in the case of a Sobel filter. Consequently, this method is not suitable for converting an image into an illustration image. Thus, a calculation is carried out by using the above equation so as to detect merely a dark pixel disposed in the vicinity of a bright pixel, that obtains a positive difference between the memory M1 and the memory M2.

Next, the binary section 20b of the line image generating section 20 converts the original image into a binary one in accordance with the brightness value stored in the memory M3(S74). Specifically, for example, a predetermined threshold value Th1 is compared with the value of M3(x, y) stored in M3. When M3(x, y)≧Th1, M3(x, y)=0(white), and when M3(x, y)<Th1, M3(x, y)=1(black). The same operation is performed for each of the pixels in the original image (generation of a first binary image). Additionally, it is also possible to represent white as "1" and black as "0".

And then, the binary section 20b converts the image stored in the memory M1 or M2 into a binary one(generation of a second binary image) and acquires OR or AND of the binary image and the memory M3(S75).

In this step, the binary section 20b converts the original image into a binary one in accordance with the brightness value stored in the memory M1 or memory M2, and in accordance with the result of the conversion, the binary section 20b further converts the brightness value of the memory M3. Specifically, for example, a brightness value M1(x, y) stored in the memory M1 is compared with a predetermined threshold value Th2. When M1(x, y)≧Th2, OR of M3(x, y)=M3(x, y) and "0", and when M1(x, y)<Th2, OR of M3(x, y)=M3(x, y) and "1". The same operation is performed for each of the pixels in the image. Additionally, upon representing white as "1" and black as "0", when M1(x, y)≧Th2, OR of M3(x, y)=M3(x, y) and "1", and when M1(x, y)<Th2, OR of M3(x, y)=M3(x, y) and "0". The same operation is performed for each of the pixels in the image.

The brightness value, which is converted into a binary one and stored in the memory M3, serves as image data of the edge image in the original image.

With this operation, the edge image is generated. The process moves on to S62 of FIG. 23. In 62, the boundary image section 20c generates a boundary image. Namely, the boundary image section 20c generates a boundary image from the divided area image. The following explanation describes a specific method for generating a boundary image.

Initially, the memory 13c reads an area size value A(n) and an area color C(n) of each of the divided areas of the divided area image(n is an area number).

Next, the boundary image section 20c detects two areas whose boundaries are in contact with each other. For instance, in the case of a divided area image shown in FIG. 25(a), an area 61 and an area 62, an area 62 and an area 63, an area 62 and an area 64, and an area 63 and an area 64 are detected.

Next, when two areas n and n', whose area boundaries are in contact with each other, satisfy the following conditions 1 and 2 with regard to predetermined threshold values Th_A and TH_C, the boundary image section 20c defines pixels located on the boundary between the areas n and n' as black pixels. Meanwhile, when the conditions are not satisfied, pixels located on the boundary are defined as white pixels.

area size value $A(n)>Th\_A$,
and area size value $A(n')>Th\_A$     [condition 1]

color difference between area colors
$C(n)$ and $C(n')>TH\_C$     [condition 2]

Afterwards, the boundary image section 20c defines all the pixels located in each of the divided areas as white pixels, except for those positioned on the boundary. This arrangement makes it possible to generate an image (boundary image) in which pixels satisfying the above-mentioned conditions are defined as black pixels and the other pixels are defined as white pixels.

For instance, in the case of the divided area image shown in FIG. 25(a), among combinations of two areas whose boundaries are in contact with each other, on the assumption that combinations other than the combination of the area 63 and the area 64 satisfy the two conditions, a line 65 and a line 66 are painted as shown in FIG. 25(*b*).

With the conditions (1) and (2), when a boundary is located between areas whose sizes are respectively set at a threshold value or more(condition 1), and when the boundary is located between the areas whose area colors are not so similar to each other(condition 2), the boundary is painted. These conditions make it possible to generate a natural boundary image even when there are too many divided areas(excessive division).

With the above-mentioned operation, the boundary image is generated and S62 is completed. Next, the process moves on to S63.

In S63, the line image compositing section 20*d* of the line image generating section 20 produces a composite image. In this operation, the line image compositing section 20*d* produces a composite image of the edge image generated in S61 and the boundary image generated in S62. Specifically, when a black pixel is defined as "0" and a white pixel is defined as "1", the line image compositing section 20*d* acquires an AND of pixel data with regard to the same coordinates of both images so as to composite both images.

Finally, in S64, the noise removing section 20*e* of the line image generating section 20 removes an isolated area (isolated line) in the composite image(noise removal). Specifically, the operation is performed as follows:

Initially, the noise removing section 20*e* detects a black pixel in the composite image. Next, 8 pixels(8 adjacent pixels) surrounding the detected black pixel are examined so as to find the number of black pixels which is in contact with the detected pixel. When another black pixel which is in contact with the detected pixel is found, 8 adjacent pixels surrounding the found pixel are further examined so as to find the number of black pixels(number of connected pixels) in an area in which black pixels are connected with each other(black pixel area). Further, when the number of connected pixels is less than a predetermined number, the black pixel area is regarded as an isolated area(noise) so as to be converted into white pixels. And then, the noise removing section 20*e* stores the composite image, which has been subjected to a noise removing operation, in the memory 13*e* as a line image.

The above-mentioned operation completes the generation of the line image. The process moves on from S7 to S8 in FIG. 3.

In S8 of FIG. 3, the image compositing section 21 successively overlays the divided area image, the object area image, and the line image, which are generated in the aforementioned S5 through S7 so as to generate an operation result image. Referring to FIG. 2, a specific compositing method is described.

Firstly, the image compositing section 21 transfers the divided area image 23 stored in the memory 13*c* to the memory 13*f* for storing a composite result image.

And then, the image compositing section 21 transfers the object area image 24 stored in the memory 13*d* to the memory 13*f* and overlays the object area image 24 on the divided area image 23. This overlaying operation is carried out by adding pixel values(or brightness values) of the same coordinates of the images 23 and 24.

Finally, the image compositing section 21 transfers the line image 25 stored in the memory 13*e* to the memory 13*f* and overlays merely black pixels disposed in the image 25 on the composite image of the images 23 and 24 so that a composite result image 26 is finally generated.

As described above, in the present image processing device, the image dividing section 17 and the area color changing section 18 generate a divided area image, the object area generating section 19 generates an object area image, and the line image generating section 20 generates a line image, in accordance with the inputted original image. Further, the image compositing section produces a composite image of these three images so as to generate an illustration image.

Namely, in the present image processing device, the image dividing section 17, the area color changing section 18, and the object area generating section 19 carry out a subtractive process on the original image so as to generate a subtractive image(divided area image, object area image), and the line image generating section 20 generates a line image. And then, the subtractive image and the line image is made into a composite image so as to generate an illustration image.

With this arrangement, as compared with an image processing device which generates a line image made of an edge image and which colors an area surrounded by the edge (closed area), a line image does not need to be a closed area. Therefore, it is possible to prevent extraction of a number of small closed areas. Further, it is possible to prevent a state in which no closed area can be extracted.

Further, the line image generating section 20 converts the entire original image into a binary one so as to generate the line image; thus, the original image is not left in the line image. Therefore, the image is entirely converted so as not to cause an unnatural illustration image.

Furthermore, in the present image processing device, in accordance with a temporary object area(inputted mask area) specified by the user, the object area generating section 19 extracts an object area and paints the extracted object area by using a predetermined color. Therefore, an area desired by the user is subjected to a subtractive operation so as to be emphasized.

Moreover, the object area generating section 19 extracts an object area in accordance with a color distribution of the temporary object area. Therefore, the user does not need to have a temporary object area which is identical to the object area. It is merely necessary to specify an area including a part of the object area as a temporary object area. This arrangement allows the user to specify an object area in a simpler manner.

Further, in the present image processing device, the image dividing section 17 and the area color changing section 18 perform a subtractive operation evenly on the entire original image so as to generate a divided area image. Therefore, it is possible to convert areas other than an area specified by the user into an illustration image; thus, a harmonized illustration image can be generated. Here, "perform a subtractive operation evenly on the original image" means to keep using the same method while performing a subtractive operation on the entire original image.

Furthermore, in the present embodiment, a face of a person is selected as an object. On the assumption that the face is composed of one dominant color, the image processing operation of the present image processing device has been described. However, as for the present image processing device, it is also allowed to recognize that two or more dominant colors constitute the object and to perform the image processing operation in accordance with this recognition.

Figure 19A:
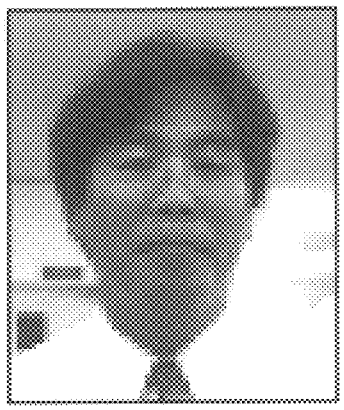
FIG. 19(a) is an explanatory drawing showing the original image including the face.
Figure 19B:
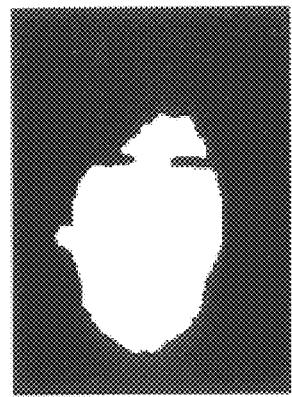
FIG. 19(b) is an explanatory drawing showing a face skin area which is extracted from the original image.
Figure 19C:
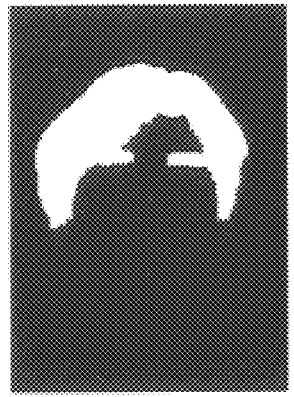
FIG. 19(c) is an explanatory drawing showing a hair area which is extracted from the original image.

In the case when the object is constituted by two or more dominant colors, upon extracting/converting the object area shown in S6 of FIG. 3, an area extraction is carried out for each of the colors. For example, an image of a face shown in FIG. 19(*a*) is separately extracted into a face area shown in FIG. 19(*b*) and a hair area shown in FIG. 19(*c*).

In the present image processing device, a hair area extracting section 19c of the object area generating section 19 extracts a hair area. When the hair area is extracted, in addition to a method which uses the possibility intensity function and is shown in FIG. 10, another method is available. A hair tends to be constituted by pixels having low lightness. Therefore, in the operation target area obtained in S41 of FIG. 10, methods such as the discriminant analysis method and the P-FILE method are adopted so as to perform a conversion into a binary image.

Figure 20A:
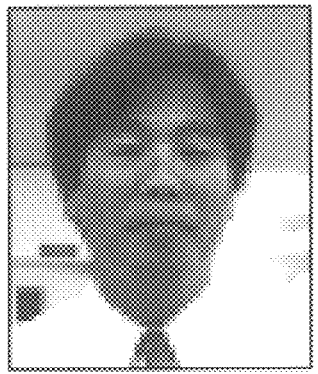
FIG. 20(a) is an explanatory drawing showing the original image including the face.
Figure 20B:
FIG. 20(b) is an explanatory drawing showing a binary image which is obtained by converting the original image into a binary one.
Figure 20C:
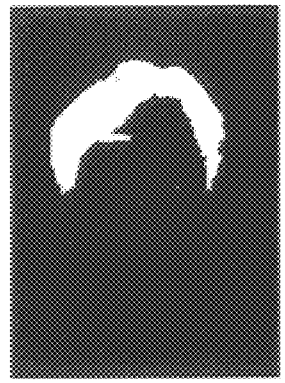
FIG. 20(c) is an explanatory drawing showing the binary image in which areas are removed except for the hair area.

For example, when the original image shown in FIG. 20(a) is converted into a binary one, an image of FIG. 20(b) is obtained. In this operation, in addition to the hair area, the other areas having low lightness are also extracted. Therefore, in the following operation, unnecessary parts are removed so as to generate an image in which merely the hair area is left, as shown in FIG. 20(c).

Figure 21A:
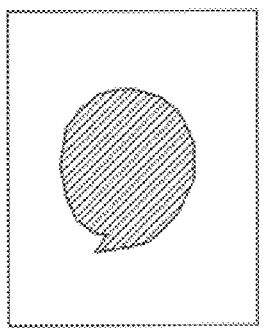
FIG. 21(a) is an explanatory drawing showing an operation target area and the input mask area.
Figure 21B:
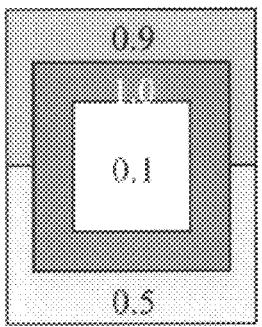
FIG. 21(b) is an explanatory drawing showing the operation target area which is divided into four areas.

Namely, in accordance with the input mask area shown in FIG. 21(a), the operation target area is divided into a plurality of areas. FIG. 21(b) shows an example in which the operation target area is divided into four areas and each of the areas is allowed to have a coefficient of weight. The weighted area size is calculated for each of the areas in accordance with the coefficient. Here, on the assumption that the area is R and the coefficient of weight at a point P is Wp, the weighted area size Rwarea of the area R is found in accordance with the following equation(15).

$$Rwarea = \Sigma Wp \; P\Sigma R \qquad (15)$$

Figure 21C:
FIG. 21(c) is an explanatory drawing showing a binary image which is obtained by converting the original image including the face into a binary one.
Figure 21D:
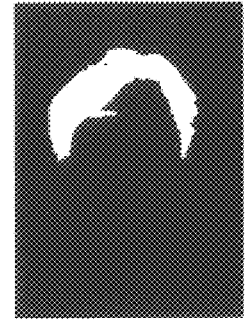
FIG. 21(d) is an explanatory drawing showing the binary image in which areas are removed except for the hair area.

An area whose weighted area size is less than a predetermined value is removed so that it is possible to extract merely the hair area. Namely, unnecessary areas are removed from the image shown in FIG. 21(c) so as to obtain an image in which merely the hair area is extracted as described in FIG. 21(d). The user can alter the method for dividing the operation target area and the coefficients of weight in many ways in accordance with the objective.

Incidentally, upon extracting an area constituted by pixels whose lightness is extremely low(black pixel), for example, an area of black hairs, or an area constituted by pixels whose saturation is extremely low(white pixel), for example, an area of a white paper, in some cases, it is desirable to adopt a binary method using the discriminant analysis method rather than the method for determining the object area possibility intensity function.

The extraction depends upon a color space in which the possibility intensity function is applied. For example, in the case of an HSV color space, as for black pixels(pixels whose RGB values are all small) or white pixels(pixels whose RGB values are all large), a conversion from the RGB value to the HSV value may not allow the hue and saturation to be precisely calculated.

Incidentally, with the above-described method, it is possible to extract an area; however, the area can be further divided into a plurality of areas.

For example, when the face area is extracted from an inputted image shown in FIG. 22(a), an image of FIG. 22(b) is obtained. The face area is divided into, for example, a bright area and a dark area. In this dividing operation as well, the discriminant analysis method and the P-TILE method can be adopted so as to make a histogram of a brightness value as for the extracted face area; thus, it is possible to determine a threshold value in accordance with the histogram. FIG. 22(c) is an image having the extracted face area which is further divided into two. The division is made in accordance with lightness of the face area of the inputted image. With the same method, the extracted area can be divided into three or more.

Further, in this case, for example, as for the face image, it is desirable that colors of areas of face, shade, and hairs be experimentally determined so as to be acceptable to a perception of a person, and it is desirable to use the determined colors for painting.

Moreover, it is desirable that the memory 13g store programs for performing some or all the image processing operations shown in FIG. 3. Further, the image inputting device 11, the area position specifying device 12, the display device 15, and the computing device 14 including the image dividing section 17, the area color changing section 18, the object area generating section 19, the line image generating section 20, and the image compositing section 21 are also allowed to read the programs if necessary so as to perform operations in accordance with the programs. Programs stored in the memory 13g are, for example, in FIG. 3, an area dividing operation program for S4, an area color changing operation program for S5, an object area generating operation program for S6, a line image generating operation program for S7, and an image compositing operation program for S8.

Further, these programs can be recorded in a recording medium such as a floppy disk and a CD-ROM so as to be read by the computer. Moreover, as shown in FIG. 1, it is possible to provide the external storage device 16 which is capable of reading such a recording medium and to transfer the respective programs from the external storage device 16 to the memory 13g.

Figure 26:
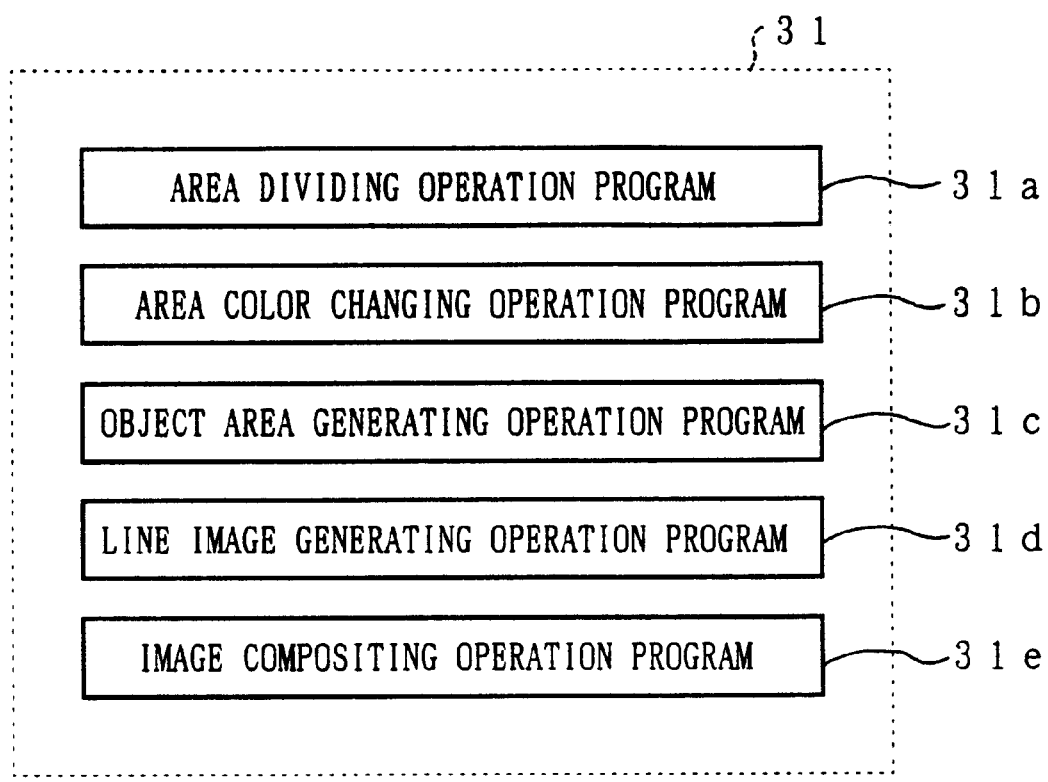
FIG. 26 is an explanatory drawing showing a recording medium which records image processing programs.

As shown in FIG. 26, for example, a recording medium 31 can be adopted as the recording medium. In the recording medium 31, an area dividing operation program 31a, an area color changing operation program 31b, an object area generating operation program 31c, a line image generating operation program 31d, and an image compositing operation program 31e are recorded. However, it is not necessary to record all the processing programs in the recording medium 31. At least one of the above-mentioned five processing programs needs to be recorded. In this case, it is possible to previously record processing programs which are not recorded in the recording medium in the memory 13g.

Furthermore, it is also possible to allow programs for performing all or some operations in the computing device 14 to be recorded in a recording medium such as a CD-ROM (Read Only Memory) and a FD(Floppy Disk) and to replace the computing device 14 with a device which is capable of reading this recording medium.

Moreover, the construction of FIG. 1 and the image processing operation of FIG. 3 in accordance with the present image processing device exemplify a case in which a color image is outputted as an operation result image.

Therefore, in the case when the present image processing device outputs a monochrome(gray scale) image as an operation result image, it is not necessary to provide a favorable construction for outputting a color image; specifically, the image dividing section 17, the memory 13c, and the boundary image section 20c of the line image generating section 20. Further, it is not necessary to carry out the operations of S4 and S5, that are shown in the flowchart of FIG. 3.

In this case, in S8 of the image processing shown in FIG. 3, the image compositing section 21 successively overlays the object area image 24 and the line image 25(shown in FIG. 2) stored in the memories 13d and 13e so as to produce a composite image. The image compositing section 21 stores the composite image in the memory 13f as the operation result image 27. And then, the process moves on to S9.

Moreover, upon outputting a monochrome image, in S55 of the object area extracting/converting operation shown in FIG. 10, it is desirable that a binary color(white or black) be used for painting the object area extracted in S54.

For instance, when the object is a face of a person, it is desirable to paint hairs in black pixels, the face in white pixels, and a shaded area in a check of black and white.

When S4 and S5 of FIG. 3 are omitted for outputting a monochrome image, a divided area image is not generated. Therefore, in the line image generating operation shown in the flowchart of FIG. 24, the boundary image generation of S62 is not carried out. Therefore, in this case, it is possible to allow the composite image generated in S63 to be identical to the edge image generated in S61.

Further, the present embodiment describes a case in which the original image is a color image; however, the present image processing device is also capable of processing a monochrome(gray scale) original image.

In the case of a monochrome original image, in the smoothing operation performed in the area dividing operation of FIG. 4(S11), it is possible to adopt an average brightness value of each of the pixels instead of an average brightness value for each monochromatic light of each of the pixels. In the same manner, in the labeling operation of S12, subtraction is carried out between brightness values of the pixels so as to calculate a difference value, and the difference value can be defined as a color difference.

Further, in the case of a monochrome original image, in the area color changing operation shown in FIG. 6, it is possible to adopt a brightness value of a pixel as a brightness value of each of the monochromatic lights in the pixel. Therefore, in this case, brightness values of the respective monochromatic lights are set at the same value.

Furthermore, in the case of a monochrome original image, the object area extracting/converting operation shown in the flowchart of FIG. 10(S6 of FIG. 3) is performed as follows: in the case when the original image is a color image, upon analyzing a color distribution of an object which is to be extracted, an HSV value distribution, which is obtained by converting a RGB value of each of the pixels, is analyzed in advance.

Meanwhile, in the case when the original image is a monochrome image, the same analyzing method is adopted so as to analyze a brightness value of each of the pixels. Namely, in this case, with regard to a variety of objects, a "brightness value distribution" is found instead of a "color distribution". Therefore, in this analysis, a "dominant brightness" is calculated instead of a "dominant color".

Hence, in a monochrome image, merely a brightness value is used so that merely one object area possibility density function is obtained. Therefore, in the operation performed in S43 of FIG. 10, instead of an average and dispersion of hue, saturation, and lightness, an average and dispersion of a "brightness" is calculated. Further, in the operations performed in S42 and S44, merely a brightness value is adopted as an argument so as to select a possible object area pixel and an object area pixel. With this method, even in the case of a monochrome original image, it is possible to obtain an object area extracted image.

As described above, even when the original image is a monochrome image, the present image processing device is capable of generating a natural illustration image in which an area desired by the user is emphasized.

Moreover, with regard to a calculation of a color difference in the labeling operation performed in S12 of FIG. 4, the following method is also available: a brightness value of each monochromatic light of each of the pixels is converted into an HSV value represented by a hue(H), saturation(S), and brightness(V). And then, it is possible to adopt a distance between two pixels in an HSV space as a color difference. Upon calculating a color difference by using this method, in the case of a monochrome original image, it is possible to arrange a brightness value of the pixel of V, and values H and S of 0; thus, a color difference can be calculated in the same manner as the case of a color image. Further, another method can be adopted as a method for calculating a color difference.

Furthermore, the labeling operation can be performed by using the following operation: with regard to a pixel located on an arbitrary position, a color difference is calculated between the pixel and a plurality of adjacent pixels. And then, the color difference is compared with a predetermined reference color difference. When the color difference is not less than the reference color difference, it is understood that the pixel belongs to a different area so that the pixel is given an area number which is different from that of the adjacent pixels. Meanwhile, when the color difference is less than the reference color difference, it is understood that the pixel belongs to the same area so that the pixel is given the same number as the adjacent pixels. As described above, the labeling operation is performed so that each of the pixels constituting the smoothed image belongs to any one of a plurality of areas. Hereinafter, an image, in which an area number serving as pixel data is given to each of the pixels, is defined as a labeled image. Moreover, another method can be adopted for performing the smoothing operation.

Further, in the present embodiment, prior to the object area extracting/converting operation shown in S6 of FIG. 3, a color distribution is analyzed in advance with regard to a variety of objects, and functions are generated as shown in equations (1) through (7). And then, these functions are generated in accordance with an average and dispersion of a hue value, saturation value, and lightness value with regard to the pixels constituting the object.

However, upon calculating the average and dispersion, if values which are apart from the average are included, the dispersion is estimated larger even in the case of a small number of such values. Therefore, when an average and dispersion are calculated after such values have been removed as abnormal values, it is possible to obtain a normal distribution curve(possibility intensity function) which can be applied to a more correct distribution. Here, values which are apart from the average are, for example, values of 100 and −150 in a hue distribution histogram shown in FIG. 12(a), in which most pixels normally have hues ranging between ±30 of 20.

Moreover, in the operation performed in S42 of FIG. 10, upon selecting possible object area pixels, it is also possible to arrange different possibilities for the case when the argument is smaller than the average(maximum point in the normal distribution curve) and for the case when the argument is larger than the average. Further, the operation performed in S43 of FIG. 10 is also regarded as a calculating operation which determines the average and dispersion of a hue, saturation, and lightness with regard to the other pixels.

Additionally, it is also understood that the values applied to the above-mentioned equations (2) through (4) indicated in the present embodiment offer a possibility that the pixel may constitute an object area which is to be extracted, when the hue, saturation, and brightness of the pixel are applied to each of the equations.

Further, in S42 and S44 of FIG. 10, the possible object area pixels and object area pixels are selected in accordance with the possibility. However, because of a photographing property, if necessary, it is also effective to suitably adjust a threshold value so as to be close to values(hue value, saturation value, and lightness value) defined by the possibility.

Figure 14A:
FIG. 14(a) is an explanatory drawing showing the original image including the face.

For example, as shown in FIG. 14(a), in the case when the object is a face, with regard to the lightness, the face apparently differs from hairs in lightness. Therefore, in a histogram shown in FIG. 14(b), a portion having a small lightness value forms a mountain 45 which shows hairs, and a portion having a relatively high lightness forms a mountain 46 which shows the face area.

Figure 14B:
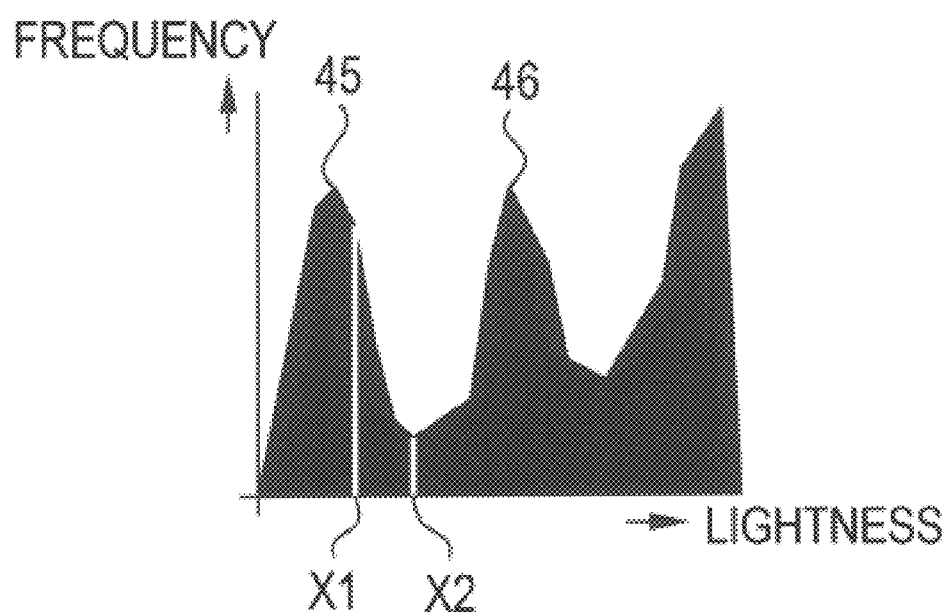
FIG. 14(b) is a graph showing a histogram of the image shown in FIG. 14(a).

Therefore, with regard to the image of FIG. 14(a), if merely the possibility is simply adopted for determining the threshold value, as shown in FIG. 14(b), the threshold value is set at a position having a lightness value of X1 so that some hairs may be extracted as face skin pixels. Hence, in this case, it is effective to adopt an algorithm such as "Otsu discriminant analysis" and to set the threshold value of the lightness at a more appropriate value such as X2 when the brightness value is not more than an appropriate value.

Moreover, "Otsu discriminant analysis method(an automatic threshold selection method based on discriminant and least squares criteria)" and "P-TILE method" of the present embodiment are fully described in a technical literature, "Image Analysis Handbook, University of Tokyo Press, 1991(p.503), supervised by Mikio Takagi and Hirohisa Shimoda".

Further, in the present embodiment, prior to the object area extracting/converting operation shown in S6 of FIG. 3, a color distribution is analyzed with regard to a variety of objects and the color distribution is stored in a predetermined storage section(not shown). This analysis can be manually performed.

Furthermore, the above-mentioned analysis can be performed as follows:

1. Merely an area which is constituted by the most dominant color of the object is extracted from the image having the target object by a manual operation so as to generate a dominant area color image. In the case when the object is a face as shown in FIG. 11(a), the dominant color is a flesh color as shown in FIG. 11(b). The dominant color is a color type indicating the color of the object.

2. The same image is plurally produced for another object.

3. With regard to these dominant color area images, FIG. 12 shows the color distributions of the pixels as occurrence frequency histograms. Namely, a curve 32a of FIG. 12(a) is a hue histogram, a curve 32c of FIG. 12(b) is a saturation histogram, and a curve 32e of FIG. 12(c) is a lightness histogram.

4. The average distribution and dispersion is found for each histogram, and a normal probability intensity function (the following equation(1)) is found so as to be the most appropriate for the distribution. The normal probability intensity functions of the hue, saturation, and lightness are respectively a curve 32b in FIG. 12(a), a curve 32d in FIG. 12(b), and a curve 32f in FIG. 12(c).

In S74 of the edge image generating operation shown in FIG. 24, it is possible to adopt another method which determines the threshold value Th1 in accordance with the need, instead of using the predetermined value. Other methods can be also adopted in S74. For example, it is possible to adopt the public known "Otsu discriminant analysis method", and the public known "P-TILE method" can be adopted for determining the inside of the area extracted by the above-mentioned object area extracting operation.

Further, it is possible to adopt a method such as the public known "Otsu discriminant analysis method" and "P-TILE method" as a method for finding the threshold value Th2 in S75. Any one of the threshold value discriminant methods can be used in response of the need.

Moreover, in S62 of FIG. 23, the conditions 1 and 2 are set in order to generate an illustration image. In response to the objective and usage of a generated image, it is possible to set another condition.

Additionally, for calculation for finding a color difference under the condition 2, it is possible to adopt the color difference equations used in S4 of FIG. 3. Moreover, as the threshold values Th_A and TH_C used in each of the conditions, it is possible to adopt fixed values which are experimentally determined and to suitably alter the values in accordance with the image. For instance, the Th_A can be arranged so as to be 20% of the original image size (total area size value of all the areas). With this arrangement, if necessary, the size of the inputted original image multiplies 0.2 times so as to reset the Th_A in accordance with the image. This arrangement makes it possible to flexibly respond to a fluctuation in the original image size so as to generate a boundary image.

Further, as shown in FIG. 23, it is possible to simultaneously generate the edge image(S61) and the boundary image(S62).

As shown in S8 of FIG. 3, in the operation of compositing intermediate images, it is also possible to overlay pixel values, which exist in an object area portion of the object area image 24 stored in the memory 13d, on pixel values belonging to the same coordinates of the memory 13f. Moreover, among pixels of the line image 25 stored in the memory 13e, it is also possible to overlay merely black pixels on pixel values belonging to the same coordinates of the memory 13f. This arrangement makes it possible to generate a final composite result image in the memory 13f.

Further, in the image processing operation shown in FIG. 3, it is possible to simultaneously perform the operations of S4 and S5 and the operation of S6. Furthermore, the operations of S4 and S5 can be carried out prior to S3.

Additionally, in the present embodiment, the image inputting device 11 reads an image signal of the original image, that is obtained by the photographing device, from a recording medium which stores the signal, and the image inputting device 11 transmits the image signal to the storage device 13. However, in addition to this arrangement, the image inputting device 11 is also allowed to have a photographing device so as to transmit the obtained image signal into the storage device 13 in a direct manner, without using the recording medium.

Furthermore, the image signal can be generated by using a device other than the above-mentioned photographing device and a method other than the above-mentioned method. Moreover, it is also possible to adopt an image signal of an image which is produced by a person other than the user of the image processing device, for example, an image signal which is distributed by using a recording medium such as a CD-ROM. These operations for retrieving an image signal can be completed prior to an image processing operation of the image processing device, or it is possible to perform the retrieving operations just before the processing operation.

Further, it is also possible to allow the user to use the area position specifying device 12 as an object area specifying means for specifying a target object area in the image. Namely, the user can use the area position specifying device 12 so as to specify an area position(area edge coordinate position) which includes an area which is to be emphasized, while looking at the original image displayed on the display device 15. In this case, the specified area edge coordinate positions are stored in the storage device 13 and are reflected on the display device 15. For example, the area edge is shown as a line segment connecting the coordinates. Additionally, it is possible to define the area obtained in this process as an object area.

Furthermore, it is also possible to allow the area color changing section 18 to be arranged as a dividedly converted area image generating means which determines a color of each of the divided areas so as to generate a dividedly converted area image. Additionally, it is also possible to allow the object area generating section 19 to be arranged as an object area converted image generating means which extracts an object area and determines a color of the object area so as to generate an object area converted image.

Additionally, as shown in FIG. 2, the object area edge 22c does not need to completely correspond to the actual object area(face area) of the original image 22b. Further, it is not necessary to specify the object area edge 22c as a completely closed edge. In the case when a closed edge is not specified, it is possible to connect the start point and the end point so that the edge is stored as a closed edge in the memory 13b of the storage device 13. Furthermore, the original image 22a is identical to the original image 22b shown in FIG. 2. Here, the two identical images are shown for convenience of explanation. Namely, the original image 22a shows the image before the area has been specified, and the original image 22b shows the image after the area has been specified.

Furthermore, in S21 of the area color changing operation shown in FIG. 6(in S6 of FIG. 3), a representative color can be calculated as follows: an average is determined with regard to pixel data of the original data, that correspond to coordinates of all the pixels located in an area having a certain area number in the first or second labeled image; namely, an average is found with regard to a brightness value for each of the monochromatic lights. And then, the pixel data, which have the average brightness value calculated for each of the monochromatic lights as a brightness value of each of the monochromatic lights, are defined as a representative color of the area. It is possible to adopt another method for calculating a representative color.

Moreover, in S23 of FIG. 6, in accordance with the brightness value of the representative color which is found in S22, it is also possible to uniquely relate the representative color to one of the tones in the tone space. And then, in S26, the saturation and brightness of the representative color can be altered in accordance with the tone. Namely, it is also possible to define the saturation and brightness, which have been uniquely related to the tone of the representative color, as the saturation and brightness of the area color belonging to the area.

Figure 17A:
FIG. 17(a) is an explanatory drawing showing the object area extracted image which is converted into a monochrome image.
Figure 17B:
FIG. 17(b) is an explanatory drawing showing the object area extracted image which is subjected to a hole-filling operation.
Figure 17C:
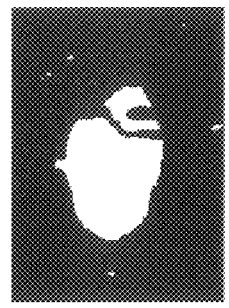
FIG. 17(c) is an explanatory drawing showing the object area extracted image in which minute areas are removed.
Figure 17D:
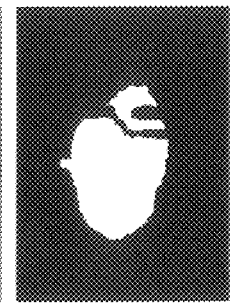
FIG. 17(d) is an explanatory drawing showing the object area extracted image in which some areas are removed.
Figure 17E:
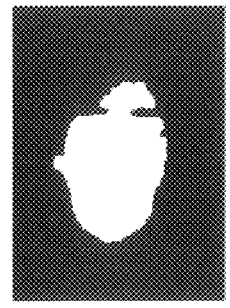
FIG. 17(e) is an explanatory drawing showing the object area extracted image which is subjected to an expanding operation.
Figure 18A:
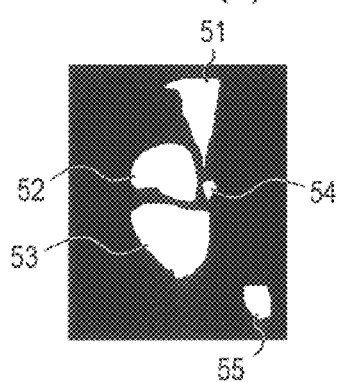
FIG. 18(a) is an explanatory drawing showing an object area extracted image which is converted into a monochrome image.
Figure 18B:
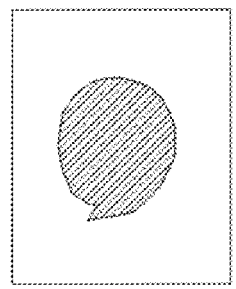
FIG. 18(b) is an explanatory drawing showing an input mask area of the image shown in FIG. 18(a).
Figure 18C:
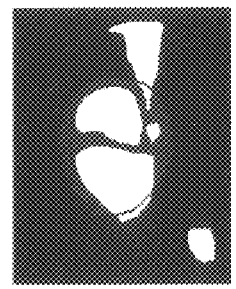
FIG. 18(c) is an explanatory drawing showing a state in which the object area extracted image shown in FIG. 18(a) and the input mask area shown in FIG. 18(b) overlay each other.
Figure 18D:
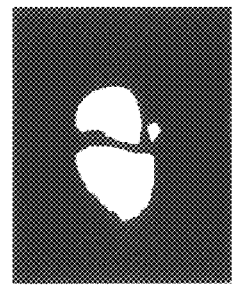
FIG. 18(d) is an explanatory drawing showing the object area extracted image in which some areas are removed.

Furthermore, in the image of FIG. 17(a), it is also understood that white pixels show the object area and black pixels show a background area.

As shown in the present embodiment, the present invention relates to a system which is provided with a device for acquiring an image, a device storing the image, and a device displaying the image, in equipments including a personal computer, a word processor, a work station, an office computer, a portable information tool, a copying machine, a scanning device, a facsimile, a television, a videocassette recorder, and a video camera. In the case when the user uses a coordinate inputting instrument such as a mouse, a pen, and a tablet so as to specify desired coordinates on the image, or in the case when the user uses a different ink, etc. so as to specify coordinates on an image printed on a paper, etc., if a system is provided with a device which can photoelectrically convert the specified coordinates and input the image and the specified coordinates, the system is applicable to the above-mentioned equipments. Moreover, it is possible to obtain an image, in which merely an area specified by the user is emphatically converted into a portrait image serving as a face image and the other areas are also converted into illustration images.

Further, the present invention can be also described as the following first through fifth image processing devices, first image processing method, and first recording medium which is computer-readable.

Namely, the first image processing device has a construction in which a composite image processing means converts an original image into an image having a desired object area emphasized and into a line image, and the composite image processing means produces a composite image of the emphatically converted image and the line image.

With the above-mentioned arrangement, it is possible to produce a composite image of (a)the emphatically converted image in which a desired object area of the original image is emphasized and (b)the line image in which the original image is converted into a line image so that it is possible to obtain an image in which merely a specific object area is emphasized.

With this arrangement, in the case when the original image is a photo, for example, as in the case of the fifth image processing device described later, a face is emphasized as an object area and the background is converted into a line image. Namely, it is possible to obtain an illustration image.

Therefore, as for an inputted original image, regardless of a result of the extracted edge, it is possible to emphasize a desired object in the original image and to convert the entire image into a natural illustration image in accordance with the actual image.

Further, the second image processing device has a construction in which an image inputting means inputs an original image, a display means displays the inputted image, an object area specifying means specifies a desired object area in the displayed original image, an emphatically converting means converts the inputted original image into an image in which the specified object area is emphasized, a line image converting means converts the inputted original image into a line image, and an image compositing means produces a composite image of the emphatically converted image obtained by the emphatically converting means and the line image obtained by the line image converting means.

With the above-mentioned arrangement, the original image inputted by the image inputting means is initially displayed on the display means. And, in the displayed original image, the user uses the object area specifying means serving as a pointing device such as a mouse and a pen so as to specify a desired object area. Afterwards, the emphatically converting means converts the original image into an image in which the specified object area is emphasized, in other words, an emphatically converted image.

Meanwhile, an edge of the entire image is extracted in accordance with the object area specified by the line image converting means so that the original image is converted into a line image. Finally, the image compositing means produces a composite image of the emphatically converted image and the line image so that it is possible to obtain an image in which the object area desired by the user is emphasized, in other words, an illustration image.

With this arrangement, unlike a simple line image generation, it is possible to emphasize the specified object area and to entirely carry out a conversion into a natural illustration image in accordance with the actual image.

Furthermore, with the arrangement of the second image processing device, the third image processing device has a construction in which: the emphatically converting means includes an image dividing means for dividing an inputted image into a plurality of areas, a dividedly converted area image generating means for determining a color for each of the divided areas so as to generate a dividedly converted area image, a divided area boundary image generating means for extracting a boundary of each of the divided areas so as to generate a boundary image of the divided areas, and an object area converted image generating means for extracting the object area specified by the object area specifying means and for determining a color of the object area so as to generate an object area converted image; and the image compositing means produces a composite image of the line image obtained by the line image converting means, the dividedly converted area image obtained by the dividedly converted area image generating means, the divided area boundary image obtained by the divided area boundary image generating means, and the object area converted image obtained by the object area converted image generating means.

With the above-mentioned arrangement, in addition to the effect of the arrangement of the second image processing device, firstly, the dividedly converted area image generating means determines a color of each of the areas divided by the image dividing means so as to generate the dividedly converted area image. Specifically, the original image is divided into a plurality of areas and a color is determined for each of the divided areas. Upon dividing the image, a gradation between colors of the adjacent pixels is taken into consideration. Next, the pixels disposed in the area are painted by using the determined colors so as to generate a dividedly converted area image.

Further, the divided area boundary image generating means extracts a boundary of each of the divided areas so as to generate a divided area boundary image. Specifically, a boundary between the divided areas is extracted and the divided area boundary image, in which pixels disposed on an area other than the boundary are made into white and pixels disposed on the boundary are made into black or white, is generated. As for the pixels disposed on the boundary, a judge is made in accordance with information on each of the divided areas.

Furthermore, with this arrangement, the user can also specify an object to be emphasized in the original image.

Next, the converted object area image generating means extracts the object area specified by the object area specifying means and determines a color of the object area so as to generate an object area converted image. Specifically, the specified object area is recognized, and a color is determined for each of the pixels disposed in the object area so as to emphasize the object. Successively, the pixels disposed in the area are painted by using the determined colors so as to generate an object area converted image.

Further, the line image converting means extracts an edge from the inputted image so as to form a line image.

Finally, the image compositing means produces a composite image of the line image, the dividedly converted area image, the divided area boundary image, and the object area converted image.

With this arrangement, unlike operations such as a subtractive process and a color painting operation which is performed in an edge area determined by an edge extraction, it is possible to perform a color painting for each of the areas in view of a gradation between colors of the adjacent pixels and to emphasize the specified object so as to generate a high-quality illustration image.

Further, with the arrangement of the second image processing device, the fourth image processing device has a construction in which: the emphatically converting means includes a converted binary object area image generating means for extracting the object area which is specified by the object area specifying means and for converting the extracted object area into a binary one so as to generate an object area converted image; and the image compositing means produces a composite image of the line image obtained by the line image converting means and the converted binary object area image obtained by the converted binary object area image generating means.

With the above-mentioned arrangement, in addition to the effect of the arrangement of the second image processing device, initially, the converted binary object area image generating means extracts the object area specified by the object area specifying means and converts the extracted object area into a binary one so as to generate an object area converted image. Specifically, the user is allowed to specify an object to be emphasized in the original image to be processed.

Next, the specified object area is recognized, and the object area is converted into a binary one so as to be emphasized; consequently, a converted binary object area image is generated. Further, the line image converting means extracts an edge from the inputted image so as to generate a line image. Finally, the image compositing means produces a composite image of the converted binary object area converting image and the line image.

With this arrangement, unlike a simple binary operation, it is possible to emphasize the specified object so as to generate a high-quality monochromatic illustration image.

Further, with the arrangement of any one of the second through fourth image processing devices, the fifth image processing device has a construction in which the object area specifying means specifies a face of a person as an object area.

With the above-mentioned arrangement, in addition to the effect of any one of the second through fourth image processing devices, it is possible to readily generate a color or monochromatic illustration image in which the face is emphasized so as to be made into a portrait image, from a photo of a person, etc. in which a face serves as an object in the inputted original image.

Further, the first image processing method includes the steps of: a first step for inputting the original image, a second step for displaying the inputted original image, a third step for specifying a desired object area in the displayed original image, a fourth step for converting the inputted original image into an image in which the specified object area is emphasized, a fifth step for converting the inputted original image into a line image, and a sixth step for producing a composite image of the emphatically converted image obtained in the fourth step and the line image obtained in the fifth step.

With this method, unlike a simple line image generation, it is possible to emphasize the specified object area and to convert the entire image into a natural illustration image in accordance with the actual image.

Further, the first recording medium, which is computer-readable, records image processing programs for carrying out the steps of: the first step for inputting the original image, the second step for displaying the inputted original image, the third step for specifying a desired object area in the displayed original image, the fourth step for converting the inputted original image into an image in which the specified object area is emphasized, the fifth step for converting the inputted original image into a line image, and the sixth step for producing a composite image of the emphatically converted image obtained in the fourth step and the line image obtained in the fifth step.

The recording medium is used in a computer so that unlike a simple line image generation, it is possible to emphasize the specified object area and to convert the entire image into a natural illustration image in accordance with the actual image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device, which performs an image processing operation on an inputted original image, comprising
    a subtractive image generating section for performing a subtractive process on the original image so as to generate a subtractive image;
    a line image generating section for generating a line image from the original image; and
    an image compositing section for producing a composite image of the subtractive image and the line image, wherein the subtractive image generating section performs a subtractive process on an object area to be emphasized and removes an area other than the object area so as to generate a subtractive image.

2. The image processing device as defined in claim 1, further comprising an area position specifying section which enables the user to specify a first area in the original image,
    wherein said subtractive image generating section includes a first subtractive image generating section for specifying an object area to be emphasized in accordance with the first area specified by the user via the area position specifying section, performing the subtractive process on the object area, and removing an area other than the object area so as to generate a first subtractive image, said first subtractive image being outputted as a subtractive image.

3. The image processing device as defined in claim 2, wherein said first subtractive image generating section includes: an object area extracting section for extracting the object area in accordance with the first area, and
    an object area color setting section for arranging a color of the object area so as to generate the first subtractive image.

4. The image processing device as defined in claim 3, wherein said object area extracting section determines a color distribution of the first area and specifies a pixel constituting the object area in accordance with the color distribution so as to extract the object area.

5. The image processing device as defined in claim 3, wherein said object area extracting section divides the first area into a plurality of areas and extracts an object area for each of the areas.

6. The image processing device as defined in claim 3, wherein said object area color setting section adopts a color, which is predetermined for each of the objects, as a color for the extracted object area.

7. The image processing device as defined in claim 3, wherein said object area color setting section enables the extracted object area to have a color of white or black.

8. The image processing device as defined in claim 2, wherein said subtractive image generating section further includes a second subtractive image generating section for performing the subtractive process on the entire original image so as to generate a second subtractive image, said first and second subtractive images being outputted as subtractive images.

9. The image processing device as defined in claim 8, wherein said second subtractive image generating section includes:
    an image dividing section which divides the original image into a plurality of areas so as to generate a divided image, and
    an area color changing section which determines a color for each of the areas in the divided image so as to generate the second subtractive image.

10. The image processing device as defined in claim 9, wherein said image dividing section includes:
    a smoothing section which converts a brightness value of each of the pixels constituting the original image into an average brightness value of the adjacent pixels so as to generate a smoothed image,
    a labeling section which places a predetermined kind of label on each of the pixels in accordance with a brightness value of each of the pixels constituting the smoothed image so as to generate a first labeled image, and
    a mode filter section which converts a label of a pixel constituting the first labeled image into a label belonging to the largest number of pixels among pixels surrounding the pixel so as to generate a second labeled image, and which defines areas constituted by pixels successively disposed with the same label, as one area so as to generate the divided image.

11. The image processing device as defined in claim 9, wherein said area color changing section includes:
    a representative color acquiring section which determines a representative color for each of the areas in the divided image, and
    a tone changing section which determines a color for each of the areas in accordance with a tone of the representative color.

12. The image processing device as defined in claim 11, wherein said line image generating section includes:
    an edge extracting section which generates an edge image from the original image,
    a boundary image section which generates a boundary image in response to a shape of each of the areas in the divided image which is generated by said image dividing section, and
    a line image compositing section which produces a composite image of the edge image and the boundary image so as to generate a line image.

13. The image processing device as defined in claim 12, wherein: said edge extracting section converts a brightness value of each of the pixels of the original image into an average brightness value of the pixel and the adjacent pixels so as to generate the smoothed image, finds a difference value between the brightness values of the original image and the smoothed image, converts the difference value into a binary value serving as a brightness value so as to generate a first binary image, converts a brightness value of the original image or the smoothed image into a binary value so as to generate a second binary image, and generates an edge image in accordance with the first and second binary images.

14. The image processing device as defined in claim 2, wherein the object area which is specified by using said area position specifying section is a face of a person.

15. The image processing device as defined in claim 1, further comprising an image inputting section wherein the original image is externally inputted.

16. The image processing device as defined in claim 15, further comprising an image display section which displays the original image, the subtractive image, the line image, and the composite image.

17. An image processing method for performing an image processing operation on an inputted original image, comprising the steps of:

a first step where the original image undergoes a subtractive process so as to generate a subtractive image;

a second step for generating a line image from the original image; and a third step for producing a composite image of the subtractive image and the line image, and wherein said first step includes a fourth step for performing a subtractive process on an object area to be emphasized and for removing an area other than the object area so as to generate a first subtractive image, and said third step produces a composite image of the first subtractive image and the line image.

18. The image processing method as defined in claim 17, wherein said first step includes a fifth step for the entire original image to evenly undergo a subtractive process so as to generate a second subtractive image, and said third step produces a composite image of the first and second subtractive images and line image.

19. A computer-readable recording medium, which records an image processing program for performing an image processing operation on an inputted original image, wherein an image processing program is recorded for a computer to carry out the steps of:

a first step for performing a subtractive process on the original image to undergo a subtractive process so as to generate a subtractive image;

a second step for generating a line image from the original image; and a third step for producing a composite image of the subtractive image and the line image, and wherein said first step includes a fourth step for performing a subtractive process on an object area to be emphasized to and for removing an area other than the object area so as to generate a first subtractive image, and said third step produces a composite image of the first subtractive image and the line image.

* * * * *